(12) United States Patent
Lim

(10) Patent No.: US 7,644,972 B2
(45) Date of Patent: Jan. 12, 2010

(54) GROCERY BAG HOLDER INTEGRATED WITH A TONNEAU COVER FEATURE

(75) Inventor: Stephen T. Lim, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 161 days.

(21) Appl. No.: 12/023,409

(22) Filed: Jan. 31, 2008

(65) Prior Publication Data

US 2009/0195006 A1 Aug. 6, 2009

(51) Int. Cl.
*B60R 7/04* (2006.01)
(52) U.S. Cl. .................................. 296/37.1; 296/24.43
(58) Field of Classification Search ............. 296/24.43; 248/99, 341; 224/497, 542, 543, 553, 925; 211/105
See application file for complete search history.

(56) References Cited

U.S. PATENT DOCUMENTS

| 5,287,971 | A | 2/1994 | Dorman |
| 5,427,288 | A | 6/1995 | Trubee |
| 5,584,523 | A | 12/1996 | Kawaguchi |
| 6,719,353 | B1 | 4/2004 | Isler et al. |
| 2004/0020956 | A1* | 2/2004 | Lobanoff .................... 224/497 |
| 2008/0142560 | A1* | 6/2008 | Lim .......................... 224/543 |

* cited by examiner

*Primary Examiner*—Dennis H Pedder
*Assistant Examiner*—Pinel E Romain
(74) *Attorney, Agent, or Firm*—Ralph E. Smith

(57) ABSTRACT

This invention provides a retractable, pivotable, slidable, and removable horizontal bar device designed for containing a cover to shield the rear compartment of an automobile from view. The bar also provides for securely holding in place conventional plastic bags when such bags, filled with groceries or other items, are being transported in a vehicle, maintaining the bags in an upright, suspended position on or above the floor of the interior trunk or cargo compartment of an automobile. A pair of the bars and holding systems may be used to further provide a detachable and removable cross support bar and dual covers to cover the entire rear compartment of an automobile.

19 Claims, 18 Drawing Sheets

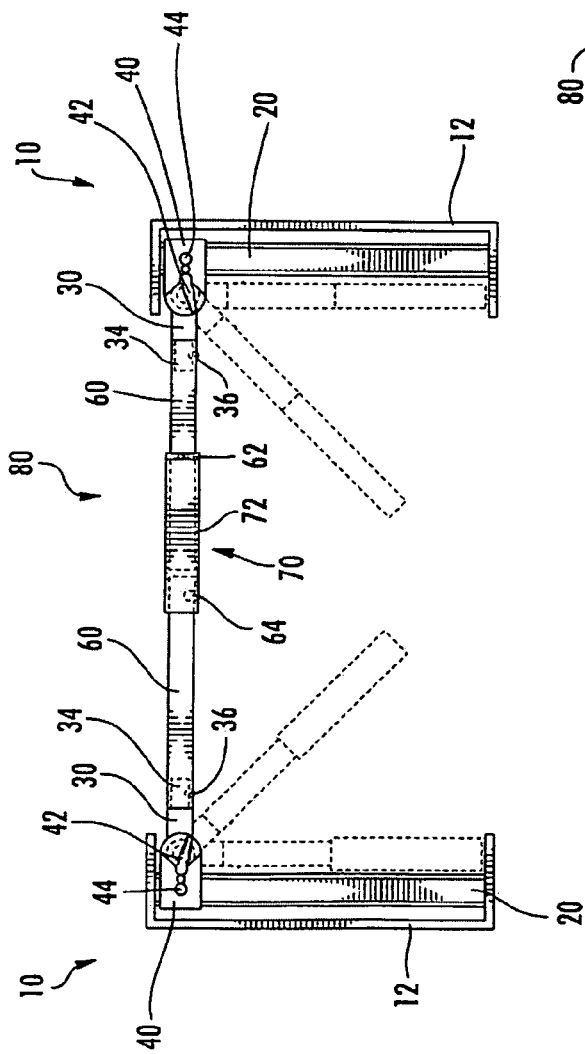
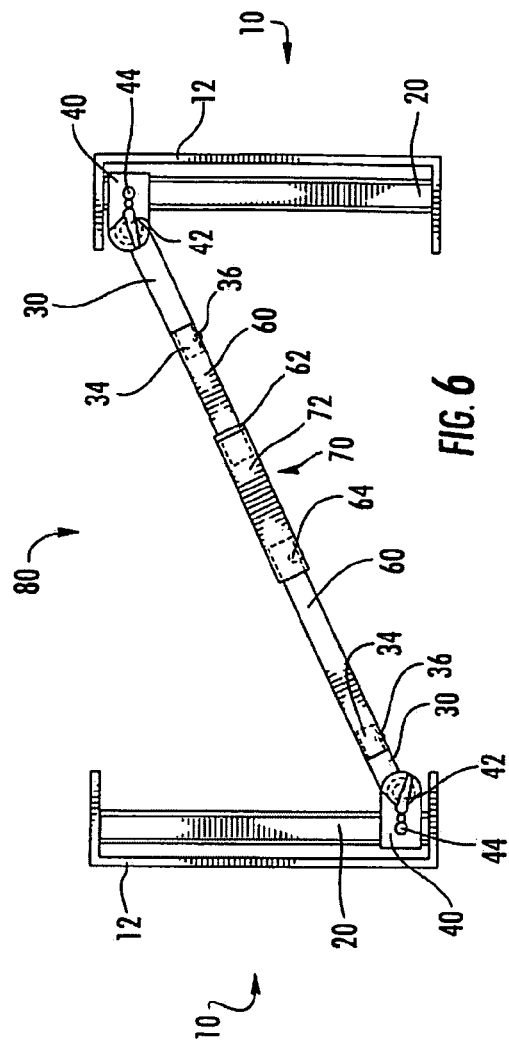
FIG. 5
FIG. 6

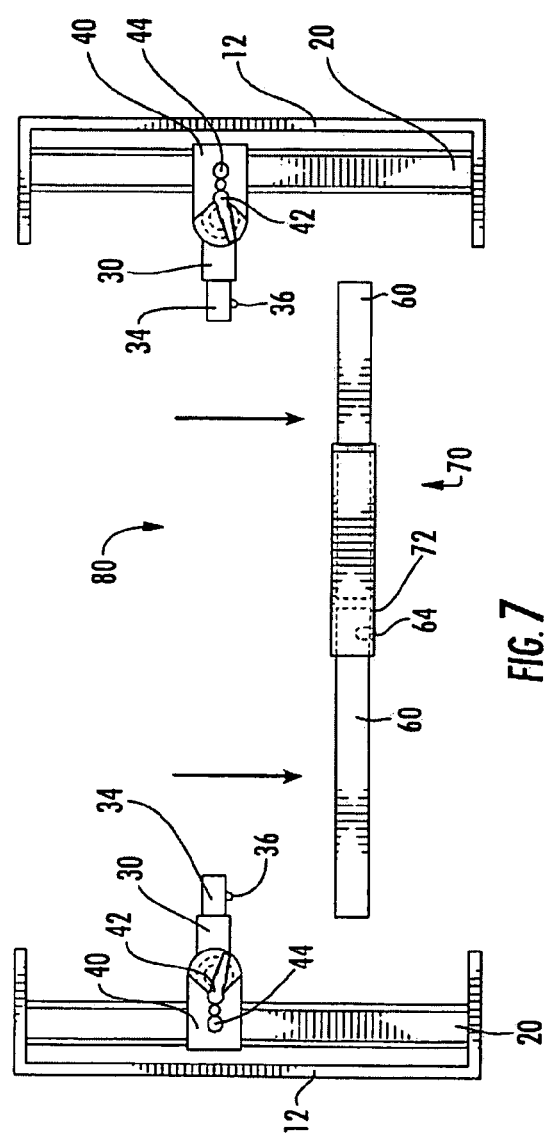
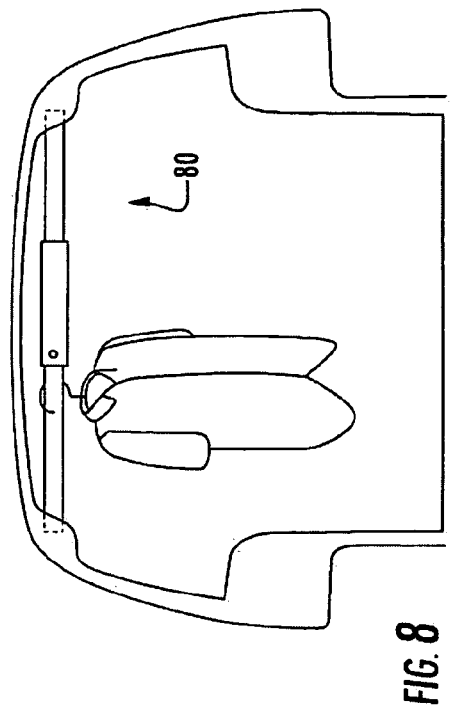
FIG. 7
FIG. 8

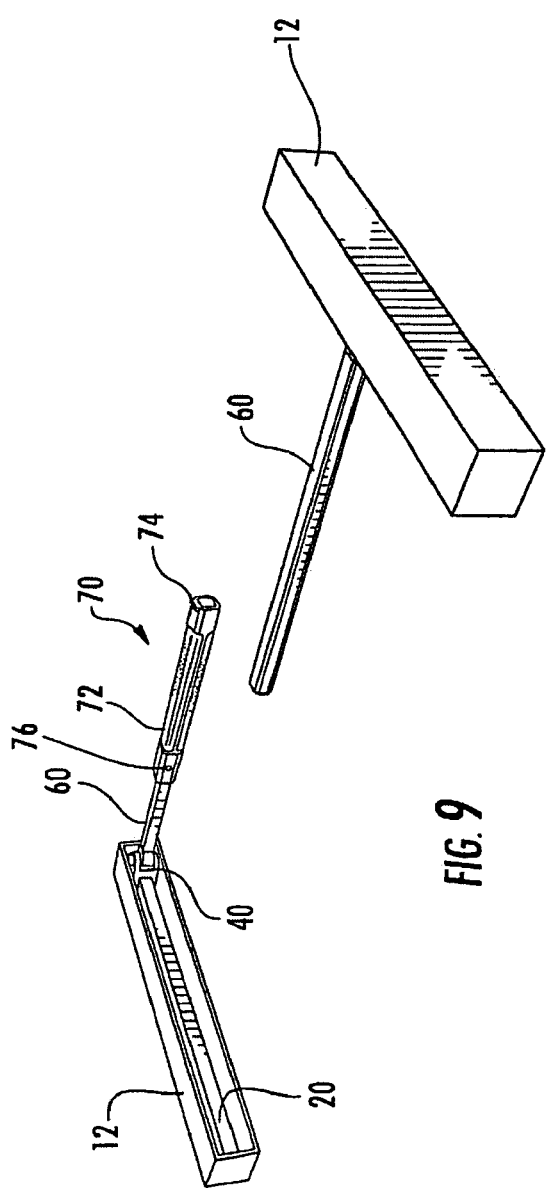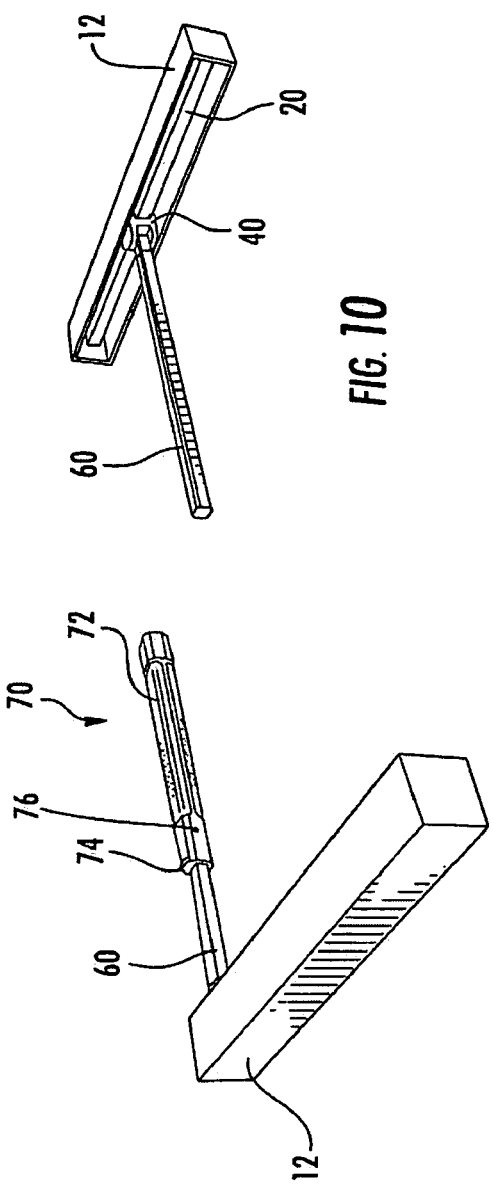
FIG. 9
FIG. 10

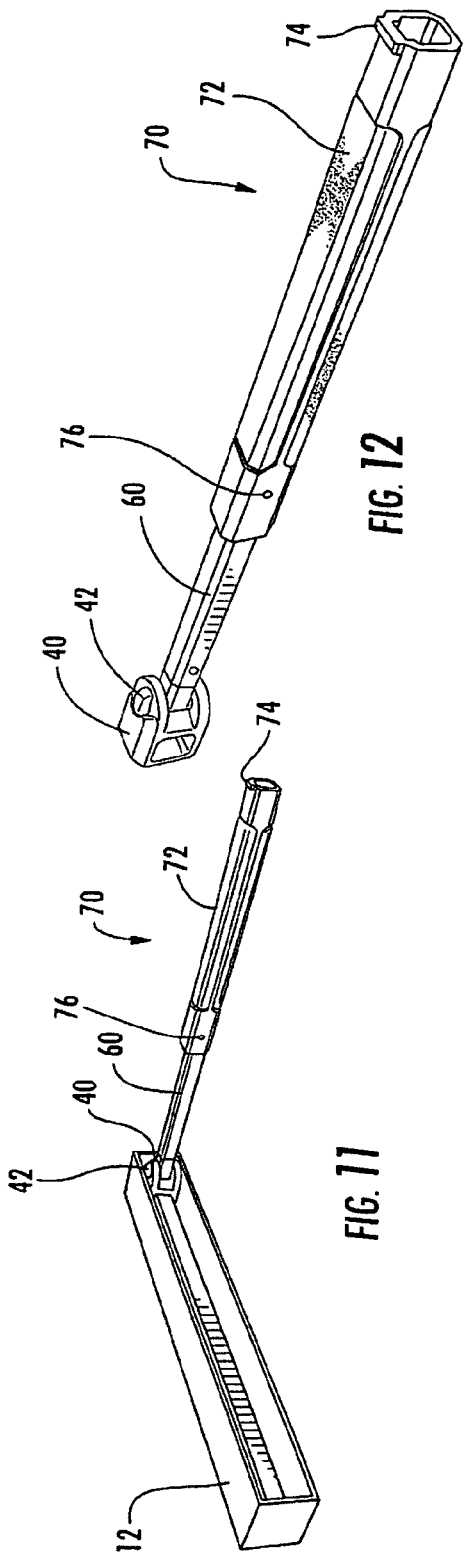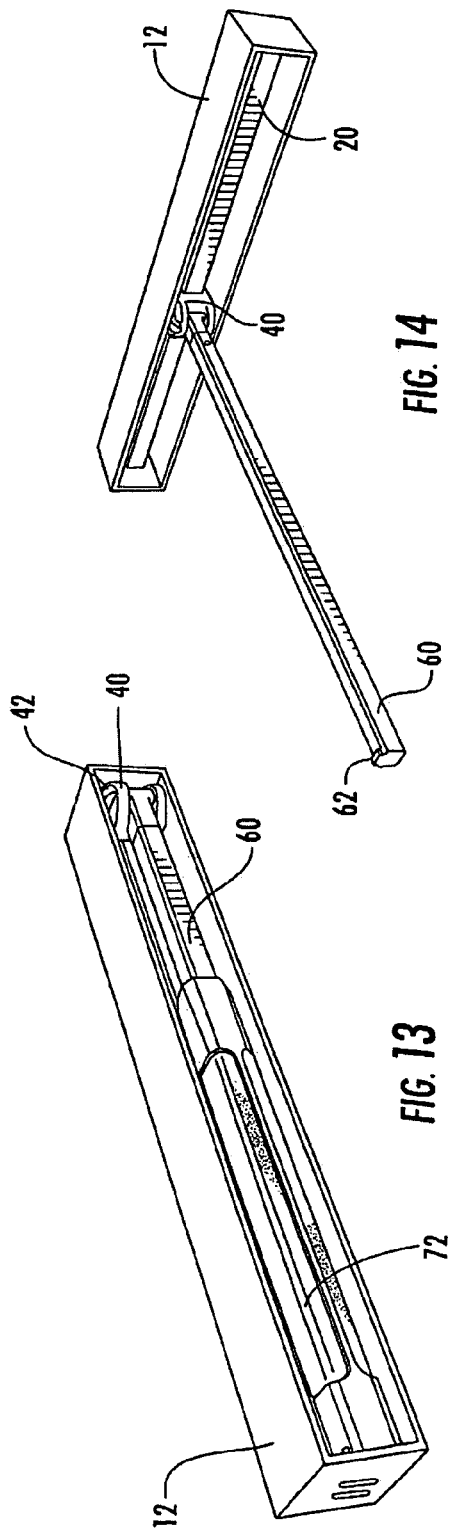

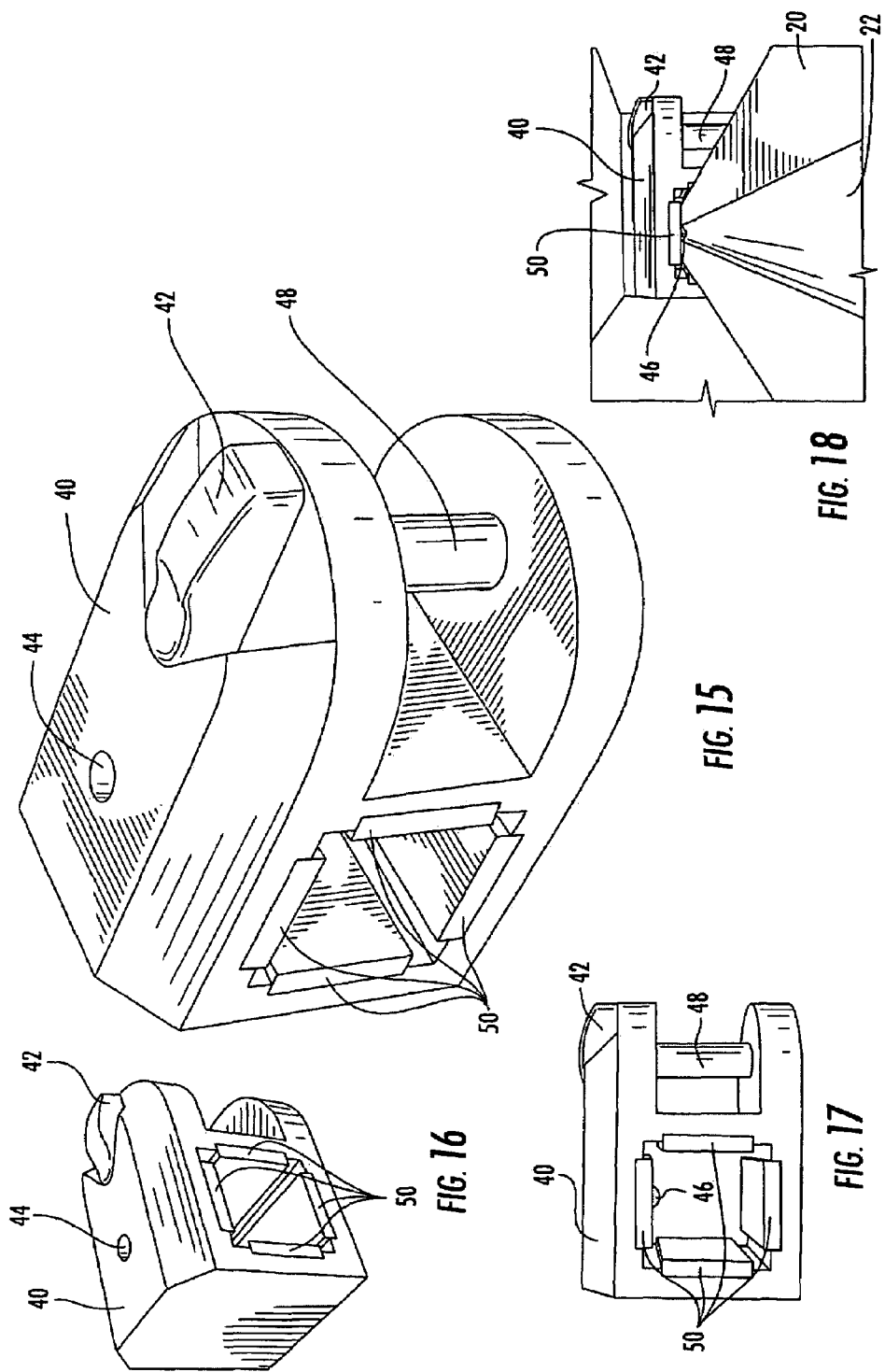

GROCERY BAG HOLDER INTEGRATED WITH A TONNEAU COVER FEATURE

FIELD OF THE INVENTION

This invention relates generally to the field of bag holding devices, and more particularly, to a retractable, pivotable, slidable, and removable horizontal bar device designed for securely holding in place conventional plastic grocery bags or the like when such grocery bags, filled with groceries or other items, are being transported in a vehicle. The device maintains the bags in an upright, suspended position on or above the floor of the interior trunk or cargo compartment of an automobile. The device also has concealed inside it a retractable cover that extends from the bar to shield the contents of the rear of the automobile from view. More specifically, this invention relates to a Tonneau cover that extends and retracts from within the bag holding device.

BACKGROUND OF THE INVENTION

The grocery bags now in general use in supermarkets are formed of a thin plastic material having a pair of upwardly extending handle loops on opposing sides of the bag. Once such bags are placed in an interior compartment of an automobile, such as a trunk or rear cargo space, the bags and their various contents, which have no lateral or suspension support, are subject to shifting and disorder, often resulting in spilled contents which have escaped their bag. Thus, a need exists for a grocery bag holding system for loading, storing, securing, and unloading such grocery bags in an interior cargo compartment of an automobile.

A variety of grocery bag holders, and like devices, have been described previously and are known in the related art. None of the grocery bag holders, however, are designed to solve the particular problem addressed by the present invention and none are capable of being modified to do so. For example, U.S. Pat. No. 5,287,971, issued to Dorman on Feb. 22, 1994, and U.S. Pat. No. 5,427,288, issued to Trubee on Jun. 27, 1995, each disclose grocery bag holders. Both Dorman and Trubee disclose the use of clamping hooks upon which to place grocery bag handles and thus secure the bags. Neither Dorman nor Trubee disclose a grocery bag bar holding system mounted in the rear interior quarter trim panel and including a retractable, pivotable, slidable, and removable bar device designed for securely holding in place conventional plastic grocery bags. Therefore, a need still exists for a simple, inexpensive, retractable, pivotable, slidable, and removable bar holding device that enables thin, plastic bags with handles to be anchored to a supporting structure in a vehicle to prevent the bags from shifting about and creating disorder.

BRIEF SUMMARY OF THE INVENTION

In various exemplary embodiments, the present invention provides a grocery bag bar holding system for securely holding in place conventional plastic grocery bags or the like when such grocery bags, filled with groceries or other items, are being transported in a vehicle. The device maintains the bags in an upright, suspended position on or above the floor of the interior trunk or cargo compartment of an automobile. The device also has concealed inside it a retractable cover that extends from the bar to shield the contents of the rear of the automobile from view. More specifically, this invention relates to a Tonneau cover that extends and retracts from within the bag holding device.

The present invention provides a Tonneau cover system for covering the contents in the rear of an automobile while alternatively providing a means for securely holding in place bags equipped with handles in an upright, suspended position while being transported in an automobile. More specifically, the invention provides a system casing including a pivot arm and a horizontal bar member defining a gap connected to the pivot arm selectively disposed within the system casing and selectively pivoting out of the system casing. Further, the invention provides a cover wrapped around a spool assembly wherein the cover and the spool assembly are contained within the horizontal bar such that the cover is extendable through the gap in the horizontal bar, and the cover can be retracted into the horizontal bar such that once loaded with bags, the horizontal bar can be rotated back on the pivot arm and returned to the system casing, thus securely holding the bags in a suspended manner.

The present invention further provides a Tonneau cover system wherein the spool assembly can rotate and the cover can extend outward from the horizontal bar through the gap, or the spool can rotate in the opposite direction and the cover can be retracted into the horizontal bar through the gap.

In addition, the present invention also provides a Tonneau cover system including a horizontal bar sized to define a gap of such size to allow the cover to extend outward from the bar at varying angles. This allows the cover to extend outward from the Tonneau cover system without rubbing against the sides of the Tonneau cover bar defining the gap, thus reducing wear on the cover.

Further, the present invention provides a Tonneau cover system further including a raised lip, located on the top outer end of the horizontal bar, which prevents bag handles from sliding off of the horizontal bar once they are loaded.

The present invention also provides a Tonneau cover system including a handle on the cover. The handle can be of any type but is preferably sized to prevent the cover from fully retracting within the Tonneau cover bar. Thus, the cover is easily grasped and extended from the Tonneau cover bar.

Additionally, the present invention provides a Tonneau cover system including a handle on the Tonneau cover bar, the handle defining a second gap in complimentary arrangement with the gap defined by the Tonneau cover bar wherein the cover can extend through the second gap and the gap in the Tonneau cover bar. Thus, the handle wraps around the Tonneau cover bar and will not interfere with nor prevent extracting the cover from the Tonneau cover bar.

Further, the present invention includes a Tonneau cover system including a spring mechanism. The spring mechanism is designed to exert force on the Tonneau cover bar when it is rotated away from the system casing. The spring mechanism is such that it will pull or push against the Tonneau cover bar and return it to the resting position inside the system casing. This allows the Tonneau cover bar to be easily stored, and it facilitates securely holding bags to the bar. The spring mechanism can be of a variety of types of springs and can be alternatively mounted in varying positions with respect to the present invention.

In an alternative embodiment, the present invention provides a Tonneau cover system for covering the contents in the rear of an automobile while providing a means for securely holding in place grocery bags equipped with handle's in an upright, suspended position while being transported in an automobile. The invention includes a Tonneau cover system including a system casing. The system casing includes a pivot arm and a horizontal bar member defining a gap connected to the pivot arm. The horizontal bar and pivot arm are selectively disposed within the system casing and selectively pivot out of the system casing. The invention also includes a cover wrapped around a spool assembly wherein the cover and the spool assembly are contained within the horizontal bar such that the cover is extendable through the gap in the horizontal bar, and the cover can be retracted into the horizontal bar. Additionally, the invention includes a fastener secured to the bottom of the horizontal bar for securing bags in an upright position.

The present invention also provides a Tonneau cover system including a plurality of fasteners secured to the bottom of the horizontal bar for securing multiple bags in an upright, secure position.

Furthermore, the present invention provides a Tonneau cover system including a hook mounted to the horizontal bar such that a bag can be secured in an upright, secure position. Further, multiple hooks can be attached to the horizontal bar such that numerous bags can be secured. In addition to or in place of hooks, a clip can be used on the horizontal bar to secure bags in an upright position. As with hooks, a multitude of clips can be attached to the horizontal bar to attach multiple bags.

In yet another alternate embodiment, the present invention provides for a Tonneau cover system for covering the contents in the rear of an automobile while providing a means for securely holding in place bags equipped with handles in an upright, suspended position while being transported in an automobile. The Tonneau cover system includes a system casing including a first pivot arm. Attached to the first pivot arm is a first horizontal bar defining a gap and selectively disposed within the system casing, selectively pivoting out of the system casing. The present invention further provides a cover wrapped around a spool assembly wherein the cover and the spool assembly are contained within the first horizontal bar such that the cover is extendable and retractable through the gap in the first horizontal bar. Furthermore, the present invention includes a second pivot arm with an attached second horizontal bar, the second horizontal bar being connected to the second pivot arm and selectively disposed within the system casing, selectively pivoting out of the system casing. The invention provides for the first horizontal bar to pivot independently of the second horizontal bar such that the bars can be rotated together or separately. Further, the present invention includes a spring mechanism adapted to attach to and exert force upon the first horizontal bar and the second horizontal bar. The spring mechanism exerts force to return the horizontal bars to the system casing.

BRIEF DESCRIPTION OF THE DRAWINGS

The present invention is illustrated and described herein with reference to the various drawings, in which like reference numbers denote like system components and/or method steps, as appropriate, and in which:

FIG. 5 is a top planar view of a pair of grocery bag holder systems, illustrating, in particular, how two grocery bag holder systems may be used simultaneously and the resultant cross bar support that is formed by the joining the two grocery bars and where the resultant cross bar is perpendicular to each linear track;

FIG. 6 is a top planar view of a pair of grocery bag holder systems, illustrating, in particular, how two grocery bag holder systems may be used simultaneously and the resultant cross bar support that is formed by the joining the two grocery bars, where the linear slide on left linear track is in the aft position and the linear slide on the right linear track is in the forward position, and where the resultant cross bar is diagonal to each linear track;

FIG. 7 is a top planar view of a pair of grocery bag holder systems, illustrating, in particular, how when two grocery bag holder systems are used simultaneously, the cross support bar formed by the two grocery bars and one handle is detachable and removable for use elsewhere in a vehicle;

FIG. 8 is a front planar view of a detached cross support bar formed by two grocery bars and one handle, detached from a pair of grocery bag holder systems, and shown used as a crossbar to support hanging items;

FIGS. 9 and 10 are front perspective views of a pair of grocery bag holder systems and their relative position to one another as they would be placed in an automobile;

FIG. 11 is a front perspective view of a grocery bag holder system illustrating, in particular, a grocery bar extended from its system casing, a handle, a handle grip, and a raised lip on the handle;

FIG. 12 is a front perspective view of a grocery bag bar illustrating, in particular, a linear slide, a three-position release lever, pivot arm, grocery bar, handle, handle grip, and raised lip on the handle;

FIG. 13 is a front perspective view of a grocery bag holder system illustrating, in particular, a grocery bar stored in its system casing;

FIG. 14 is a front perspective view of a grocery bag holder system illustrating, in particular, the second of a pairing of grocery bag holder systems, wherein there is no handle or handle grip;

FIGS. 15 and 16 are front perspective views of a linear slide according to an embodiment of the present invention, illustrating, in particular the main pivot, three-position release lever, receptacle for the locking screw, and the nylon slide liners;

FIG. 17 is a front planar view of a linear slide according to an embodiment of the present invention, illustrating, in particular the main pivot, three-position release lever, the locking screw, and the nylon slide liners;

FIG. 18 is a front perspective view of a linear slide shown placed on a linear track, illustrating, in particular, the linear track and the linear track grove;

DETAILED DESCRIPTION OF THE INVENTION

Figure 1:
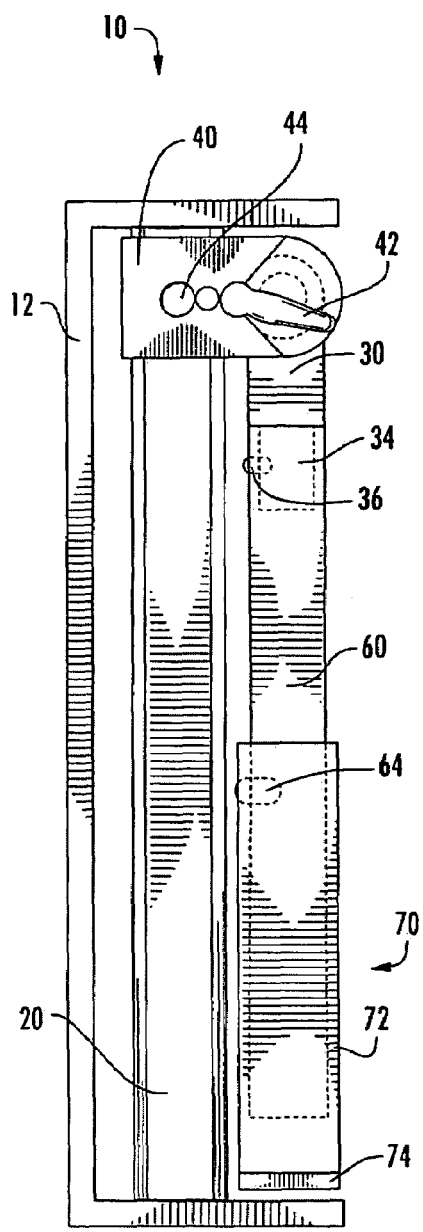
FIG. 1 is a top planar view of a grocery bag holder system according to an embodiment of the present invention, shown fully retracted into its system casing and locked in position while not in use.

Before describing the disclosed embodiments of the present invention in detail, it is to be understood that the invention is not limited in its application to the details of the particular arrangement shown here since the invention is capable of other embodiments. Also, the terminology used herein is for the purpose of description and not of limitation.

The present invention provides a bag holding system 10 for securely holding in place conventional plastic grocery bags 14 when such grocery bags 14, filled with groceries or other items, are being transported in a vehicle, maintaining the bags in an upright, suspended position on or above the floor of the interior trunk or cargo compartment of an automobile. The present invention also provides a Tonneau cover system 90 for shielding the rear compartment of an automobile from view. The present invention further provides a Tonneau cover system 90 that utilizes a cover 82 that is retractable into the Tonneau cover bar 84 for ease of storage.

Referring now to FIG. 1, a grocery bag holder system 10 is shown fully retracted into its system casing 12 and locked in position while not in use. The grocery bag holder system 10 is shown with a grocery bar 60, which pivots out of the system casing 12 located within an interior panel in a cargo area in the automobile, the grocery bar 60 mounted to a pivot arm 30 within the system casing 12. The grocery bar 60, once loaded with the bags, is rotated back on the pivot arm 30 and returned to the system casing 12, thus securely holding the bags in a suspended manner.

The grocery bag holder system 10 includes a linear slide 40, which securely holds the pivot arm 30 and the grocery bar 60 in place, and a linear track 20, upon which the linear slide 40 is mounted and moves in a linear direction. The linear slide 40 and the linear track 20, upon which the linear slide 40 is mounted, are located within the system casing 12.

The pivot arm 30, holding the grocery bar 60, is mounted to the linear slide 40, on the pivot (not shown), with the linear slide 40 moving about the linear track 20 in a linear manner. The pivot arm 30 includes a pivot arm bar 34 and a pivot arm quick release button 36 by which the grocery bar 60 is secured to, and easily removed from, the pivot arm 30.

The linear slide 40 includes a release lever 42 and a locking screw (not shown). (The receptacle for the locking screw 44, however, is shown in FIG. 1.) The release lever 42 operates to rotate the locking screw in a downward fashion into a secure position, holding the linear slide 40, pivot arm 30, and grocery bar 60 in place at a chosen location along the linear track 20.

The grocery bag holder system 10 includes a handle 70, located on the grocery bar 60 and which slides along the grocery bar 60; a handle grip 72, located on the handle 70; and a raised lip 74, located on the top outer end of the handle 70, which prevents bag handles from sliding off of the handle 70. The handle 70 is secured in place along the grocery bar 60 in holes present in the grocery bar 60, and is detached from the holes by use of the quick release button 64 located on the grocery bar 60.

Figure 2:
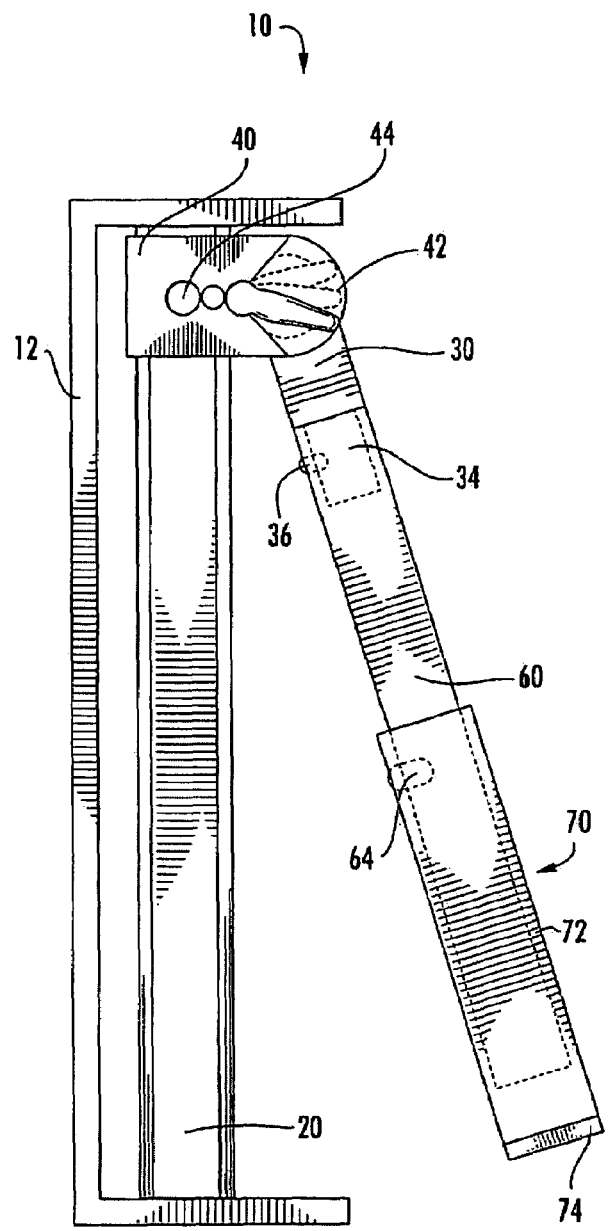
FIG. 2 is a top planar view of a grocery bag holder system, illustrating, in particular, the pivoting and rotational movement of the grocery bar, and the various angles at which the grocery bar is locked into position.

Referring now to FIG. 2, a grocery bag holder system 10 is shown, illustrating the pivoting and rotational movement of the grocery bar 60, and the various angles at which the grocery bar 60 is locked into position. In addition to the references shown in FIG. 1, the release lever 42 shown in FIG. 2 illustrates a three-position release lever 42. The locking screw position is one of one of the three positions on the release lever 42: locked, unlocked, or unlocked-but-spring-loaded to return the release lever to the locked position. As the release lever 42 is unlocked, the grocery bar 60 is gripped by the handle 70 and rotated in an outward direction from the system casing 12. At this point the grocery bar 60 may be locked while extended in an outward position at a desired angle to the linear track 20, or loaded with grocery bags and returned to the original position within the system casing 12 to securely hold grocery bags in a suspended state.

Figure 3:
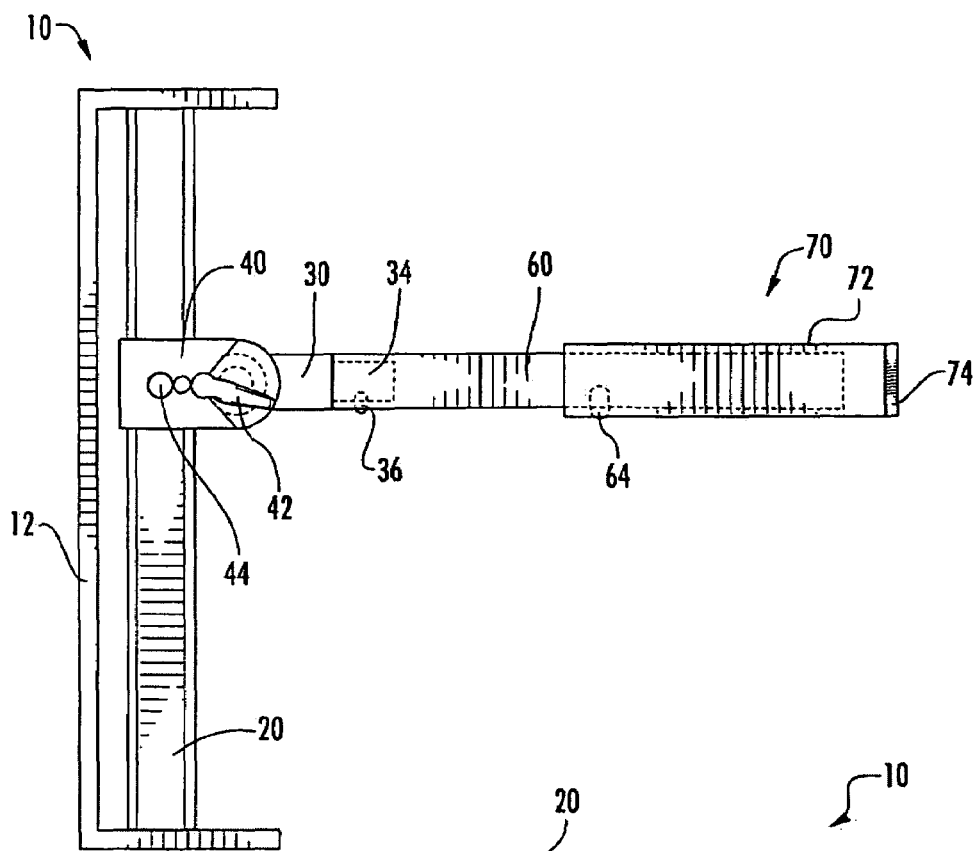
FIG. 3 is a top planar view of a grocery bag holder system, illustrating, in particular, the grocery bar extended to a generally ninety degree angle, and the movability of the linear slide upon the linear track.

Referring now to FIG. 3, a grocery bag holder system 10 is shown. The grocery bar 60, extended to a generally ninety degree angle, and the moveability of the linear slide 40 upon the linear track 20 is also shown. In this position, the grocery bar 60 is perpendicular to the linear track 20 and the system casing 12. By adjusting the release lever 42, a user may move the linear slide 40 about the linear track 20 and place it at a desired location on the linear track 20.

Figure 4:
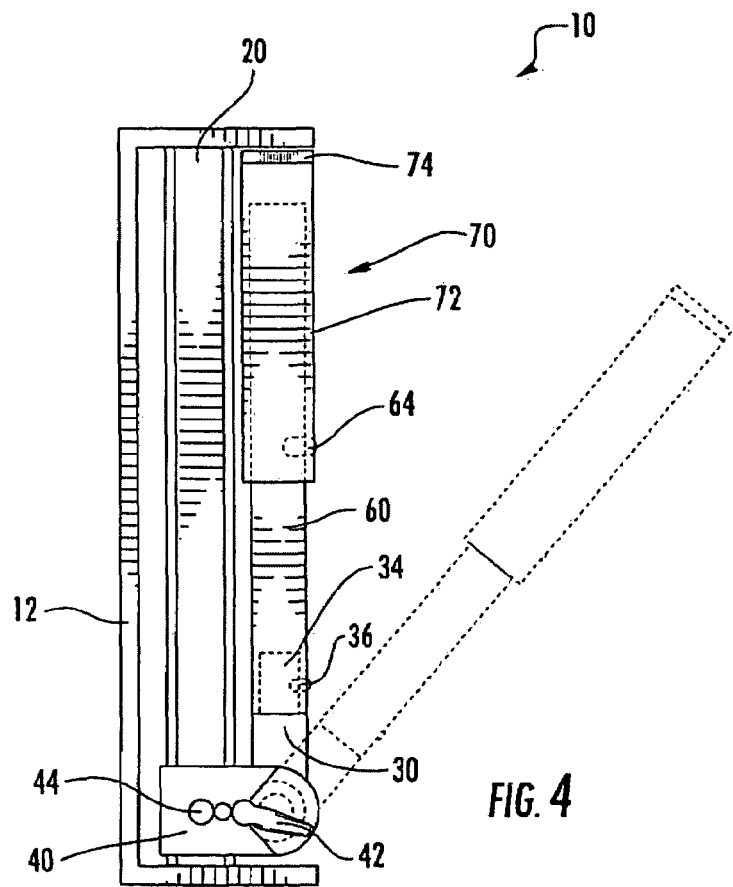
FIG. 4 is a top planar view of a grocery bag holder system, illustrating, in particular, the pivoting and rotational movement of the grocery bar, and simultaneously the repositioned linear slide at the opposite end of the linear track.

Referring now to FIG. 4, a grocery bag holder system 10 is shown, illustrating the pivoting and rotational movement of the grocery bar 60, and simultaneously the repositioned linear slide 40 at the opposite end of the linear track 20. The linear slide 40 has been positioned in the aft position of the linear track 20 and system casing 12, relative to the automobile. While in this position, the grocery bar 60 rotates back into the system casing 12 the same as it does when the linear slide 40 is the forward position of the linear track 20 and system casing 12.

Referring now to FIG. 5, a pair of grocery bag holder systems 10 is shown, illustrating how two grocery bag holder systems 10 may be used simultaneously to form a resultant cross bar support 80 by the joining the two grocery bars 60. The resultant cross bar 80 is perpendicular to each linear track 20. One grocery bag holder system 10 is placed on the left, or driver side, of the automobile, and a second grocery bag holder system 10 is placed on the right, or passenger side, of the automobile. The grocery bag holder systems 10 are identical with the exception that the one placed on the right, or passenger side, does not contain a handle 70. When two systems 10 are used together, the handle 70 in the left, or driver side, contains both grocery bars 60. Thus, two grocery bars 60 are secured together and form a cross bar support 80.

Referring now to FIG. 6, a pair of grocery bag holder systems 10, is shown illustrating, in particular, how two grocery bag holder systems 10 may be used simultaneously to form a resultant cross bar support by joining the two grocery bars 60, where the linear slide 40 on left linear track 20 is in the aft position and the linear slide 40 on the right linear track 20 is in the forward position. The resultant cross bar 80 is diagonal to each linear track 20.

Referring now to FIG. 7, a pair of grocery bag holder systems 10 is shown illustrating how when two grocery bag holder systems are used simultaneously the cross support bar 80 formed by the two grocery bars 60 and one handle 70 is detachable and removable for use elsewhere in a vehicle. As the quick release button 36 on each pivot arm 30 is depressed the cross support bar 80, formed by the combination of two grocery bars 60 and one handle 70, is detachable from the two grocery bag holder systems 10. The detached cross support bar 80 is available for use elsewhere in the automobile. The cross support bar 80 provides versatile functionality in both detached and attached modes. In one alternative embodiment, for example, the cross support bar 80, without being detached, provides load support for flip up load floors from the second row seat (not shown). In another alternative embodiment, for example, the cross support bar 80 also provides integration with a Tonneau cover (not shown). In yet another alternative embodiment, for example, the cross support bar 80 provides support for flip up shelves that are hinged on the back of the second row seat (not shown). Thus, the cross support bar 80 is useful in both detached and attached modes to provide support for various items. These alternative embodiments of the cross support bar 80 are not intended to be limiting but rather are disclosed to show the versatility and functionality of the cross support bar 80.

Referring now to FIG. 8, a detached cross support bar 80 formed by two grocery bars 60 and one handle 70, detached from a pair of grocery bag holder systems 10 is shown. The cross support bar 80 shown here is used suspended from an elevated interior position in the automobile and used to support hanging clothing items.

Referring now to FIGS. 9 and 10, a pair of grocery bag holder systems 10 and their relative position to one another as they would be placed in an automobile are shown. One grocery bag holder system 10 is placed on the left, or driver side, of the automobile, and a second grocery bag holder system 10 is placed on the right, or passenger side, of the automobile. The grocery bag holder systems 10 are identical with the exception that the one placed on the right, or passenger side, does not contain a handle 70. The grocery bars 60 are shown extended to a generally ninety degree angle to the linear track 20.

Referring now to FIG. 11, a grocery bag holder system 10 illustrating a grocery bar 60 extended from its system casing 12 is shown. The grocery bar 60 is extended to a generally ninety degree angle. In this position, the grocery bar 60 is perpendicular to the linear track 20 and the system casing 12. By adjusting the release lever 42, a user may move the linear slide 40 about the linear track 20. The grocery bar is shown equipped with a handle 70, handle grip 72, and raised lip 74 on the handle 70.

Referring now to FIG. 12, a grocery bar 60 is shown. The grocery bar 60 is mounted to the linear slide 40 and is locked into position using the three-position release lever 42. The grocery bar 60 is equipped with a handle 70, handle grip 72, and raised lip 74 on the handle 70.

Referring now to FIG. 13, a grocery bag holder system 10 is shown. The grocery bar 60 is stored and locked into position within the system casing 12 and secured into place with the three-position release lever 42.

Referring now to FIG. 14, a grocery bag holder system 10 is shown illustrating the second of a pairing of grocery bag holder systems 10, wherein there is no handle or handle grip. The grocery bar 60 includes a raised lip 62, located on the top outer end of the grocery bar 60, which prevents bag handles from sliding off of the grocery bar 60. The grocery bar 60 and linear slide 40 are shown approximately at the midpoint on the linear track 20, illustrating the moveability of the linear slide 40 upon the linear track 20 and the various locations upon the linear track 20 where the grocery bar 60 is placed.

Referring now to FIGS. 15, 16, and 17, various views of a linear slide 40 are shown. The linear slide 40 is shown with the main pivot 48, three-position release lever 42, receptacle for the locking screw 44, and the nylon slide liners 50. The slide liners 50 act as a cushion between the linear slide 40 and the linear track 20 and allow for a smooth motion about the linear track 20.

Referring now to FIG. 18, a linear slide 40 is shown. The linear slide 40 is placed on a linear track 20, illustrating the linear track 20 and the linear track grove 22. The linear slide 40 includes a release lever 42 and a locking screw 46. The linear track 20 includes a linear groove 22. The three-position release lever 42 operates to rotate the locking screw 46 in a downward fashion into a secure position, holding the linear slide 40, pivot arm (not shown), and horizontal bar (not shown) in place at a location along the linear track 20. The locking screw 46 is accepted by the linear groove 22 in the linear track 22.

Figure 19:
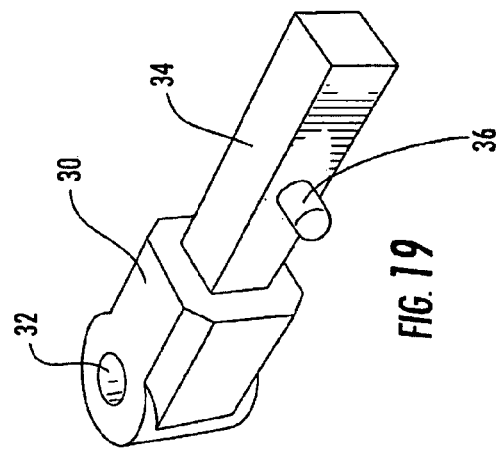
FIG. 19 is a front perspective view of a pivot arm, illustrating, in particular, the receptacle for the main pivot, the pivot arm bar, and a quick release button.

Referring now to FIG. 19, a pivot arm 30 is shown. The pivot arm 30 is illustrated with the receptacle for the main pivot 32, the pivot arm bar 34, and a quick release button 36. The pivot arm 30 is mounted on the main pivot 48 of the linear slide 40 (not shown).

Figure 20:
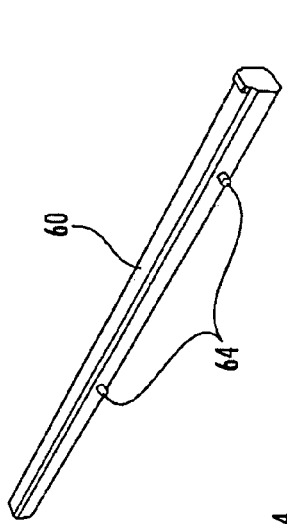
FIG. 20 is a front perspective view of a grocery bar, illustrating, in particular, two quick release buttons.
Figure 21:
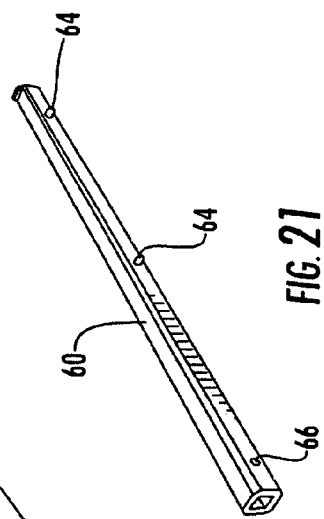
FIG. 21 is front perspective view of a grocery bar, illustrating, in particular, two quick release buttons and the hole to receive the pivot arm quick release button.

Referring now to FIGS. 20 and 21, views of a grocery bar 60 are shown. The grocery bar 60 is illustrated with two quick release buttons 64. The quick release buttons 64 are used in conjunction with the sliding handle 70 (not shown) to hold the handle in place at a predetermined location. Release of the handle 70 is accomplished by depressing the two quick release buttons 64 and then sliding the handle 70. FIG. 21 also illustrates the hole 66 in the grocery bar 60 to accept the quick release button of the pivot arm (not shown).

Figure 22:
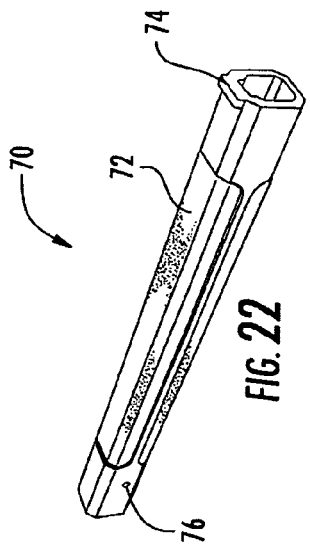
FIGS. 22 and 23 are front perspective views of a handle of the grocery bar holding system according to an embodiment of the present invention, illustrating, in particular, a handle, handle grip, raised lip, and hole to accept the grocery bar quick release button.
Figure 23:
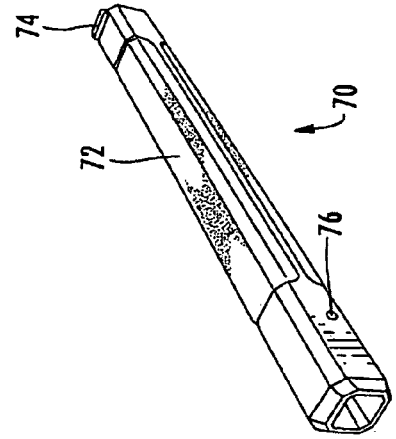

Referring now to FIGS. 22 and 23, views of a handle 70 of the grocery bar holding system 10 are shown. The handle 70 is illustrated with a handle grip 72, raised lip 74, and a hole 76 to accept the grocery bar quick release button.

Figure 24:
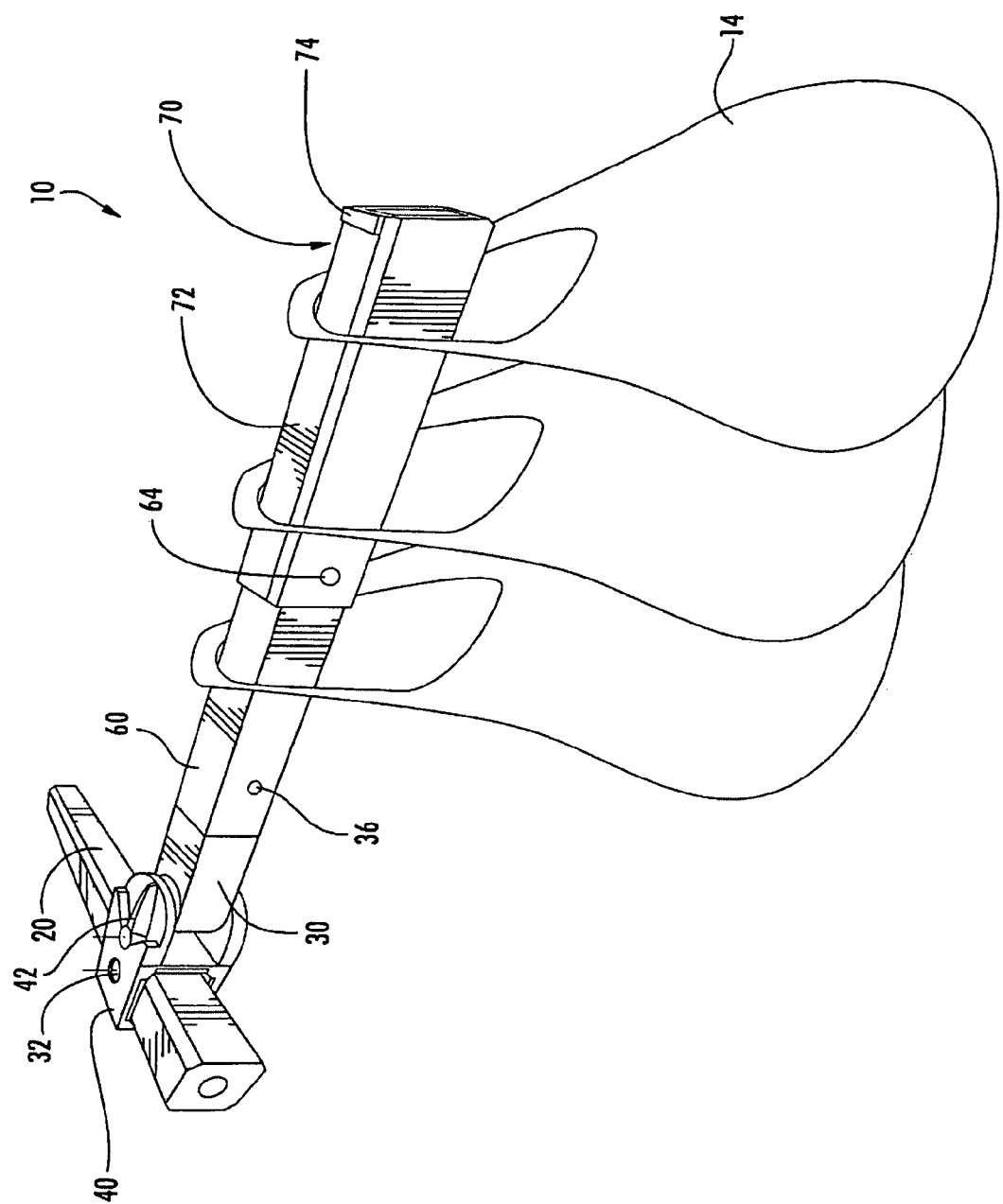
FIG. 24 is a front perspective view of a grocery bag holder system, illustrating, in particular, the grocery bar extended to a generally ninety degree angle, and the mobility of the linear slide upon the linear track, and further illustrating how three grocery bags (shown schematically) are placed on and over the grocery bar and handle before the grocery bar has been returned to its stowed location in the system casing.

Referring now to FIG. 24, a grocery bag holder system is shown in use with grocery bags 14, shown schematically. The grocery bar 60 is extended to a generally ninety degree angle, illustrating how three grocery bags 14 are placed on and over the grocery bar 60 and handle 70 before the grocery bar 60 has been returned to its stowed location in the system casing 12 (not shown). The raised lip 74 on the handle acts to prevent the grocery bags 14 from sliding off of the grocery bar 60.

Figure 25:
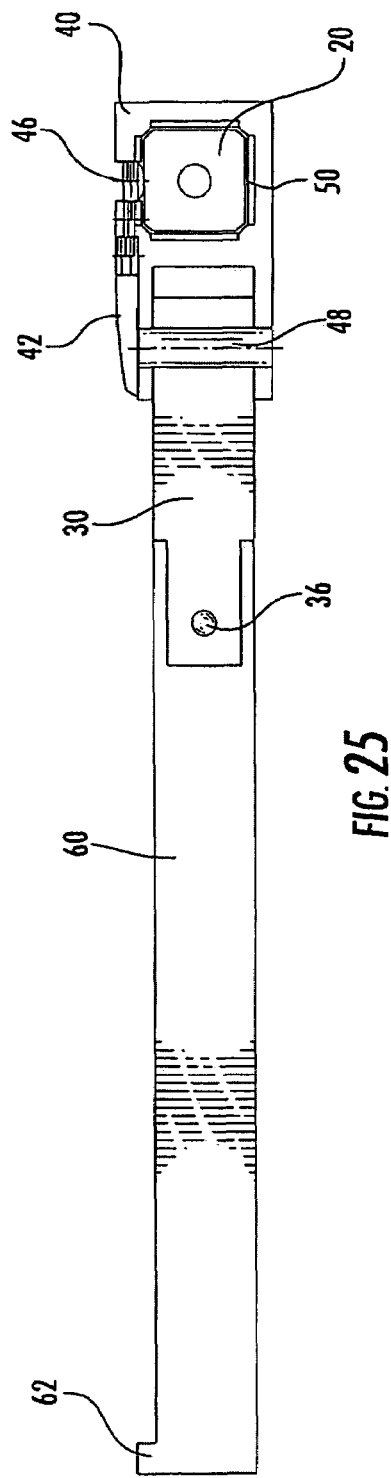
FIG. 25 is a front planar view of a grocery bag holder system illustrating, in particular, the second of a pairing of grocery bag holder systems, wherein there is no handle or handle grip.

Referring now to FIG. 25, a grocery bar 60 and linear slide 40 is shown. The grocery bar 60 shown in this figure is illustrative of a grocery bar 60 used on the right, or passenger side, of an automobile, wherein there is no handle or handle grip on the grocery bar 60. The grocery bar 60 includes a raised lip 62, located on the top outer end of the grocery bar 60, which prevents bag handles from sliding off of the grocery bar 60. The linear slide 40 is placed on a linear track 20. The linear slide 40 includes a release lever 42 and a locking screw 46. The linear track 20 includes a linear groove 22. The three-position release lever 42 operates to rotate the locking screw 46 in a downward fashion into a secure position, holding the linear slide 40, pivot arm 30, main pivot 48, and grocery bar 60 in place at a location along the linear track 20. The grocery bar 60 is detachable from the pivot arm 30 by depressing the quick release button 36.

Figure 26:
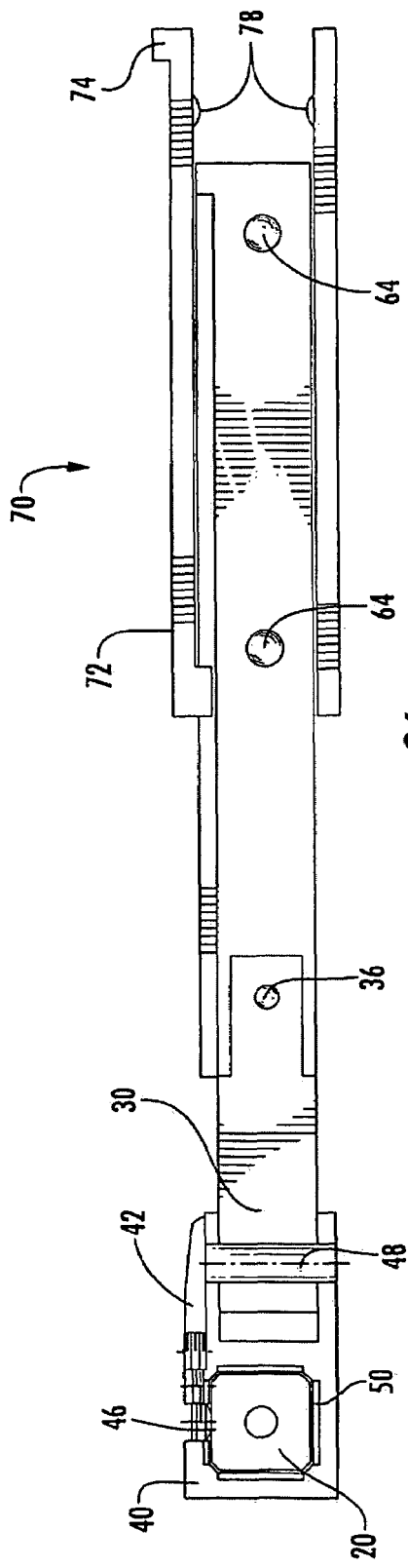
FIG. 26 is a front planar view of a grocery bag holder system illustrating, in particular, linear slide, grocery bar, handle, friction locks, and various quick release buttons.

Referring now to FIG. 26, a grocery bar 60 is shown. The grocery bar 60 shown in this figure is illustrative of a grocery bar 60 used on the left, or driver side, of an automobile. In addition to the grocery bar features shown in FIG. 25, this grocery bar 60 is illustrated with the a handle 70, friction locks 78, and quick release buttons 64 to remove the handle from the grocery bar 60.

Figure 27:
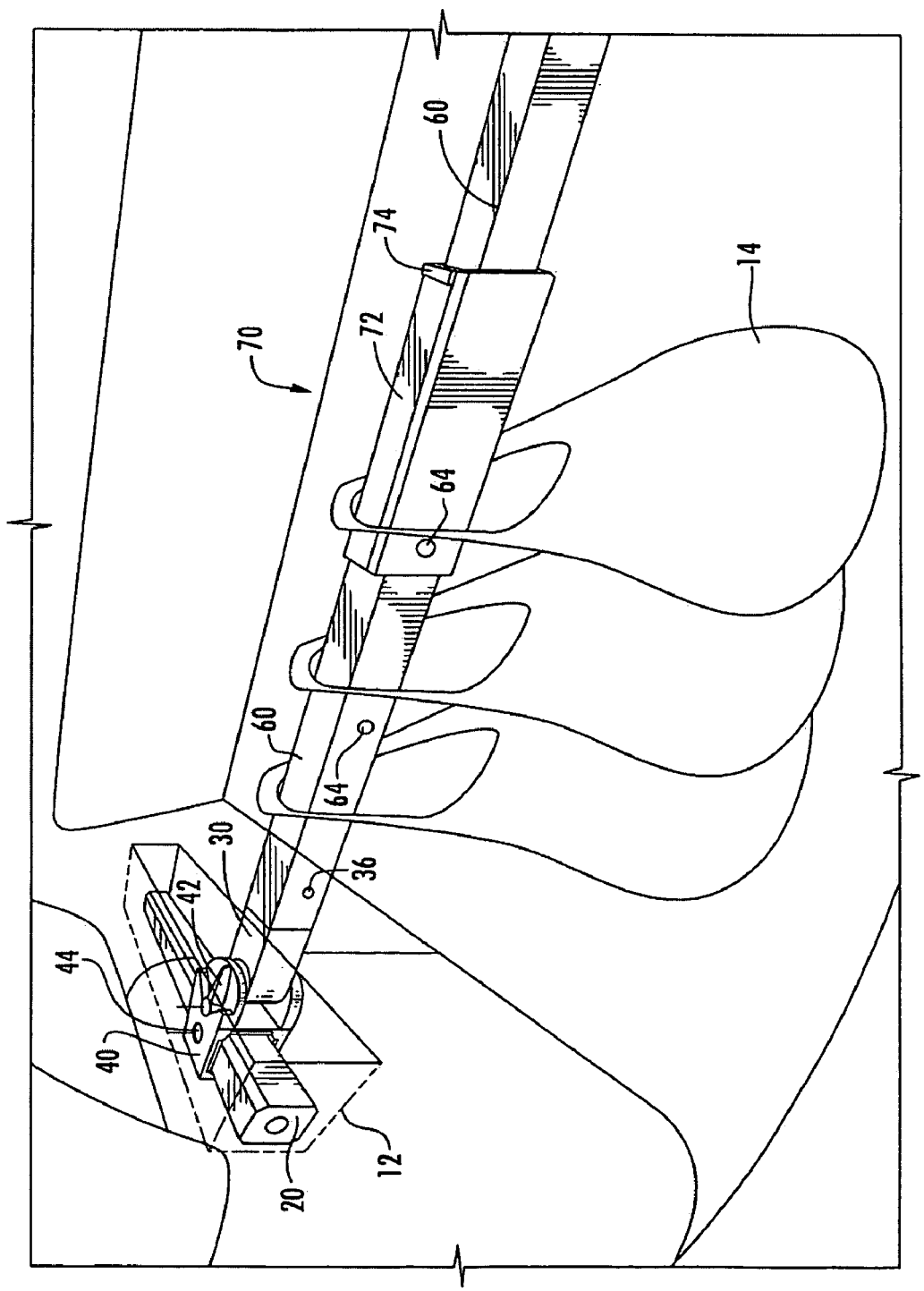
FIG. 27 is a front perspective view of a pair of grocery bag holder systems and their relative position to one another as placed in an automobile, and further illustrating three grocery bags suspended from the cross support bar created from joining the two grocery bars and secured by the handle.

Referring now to FIG. 27, a pair of grocery bag holder systems and their relative position to one another as placed in an automobile is shown. Three grocery bags 14 are shown suspended from the cross support bar created by joining the two grocery bars 60 and secured by the handle 70.

Figure 28:
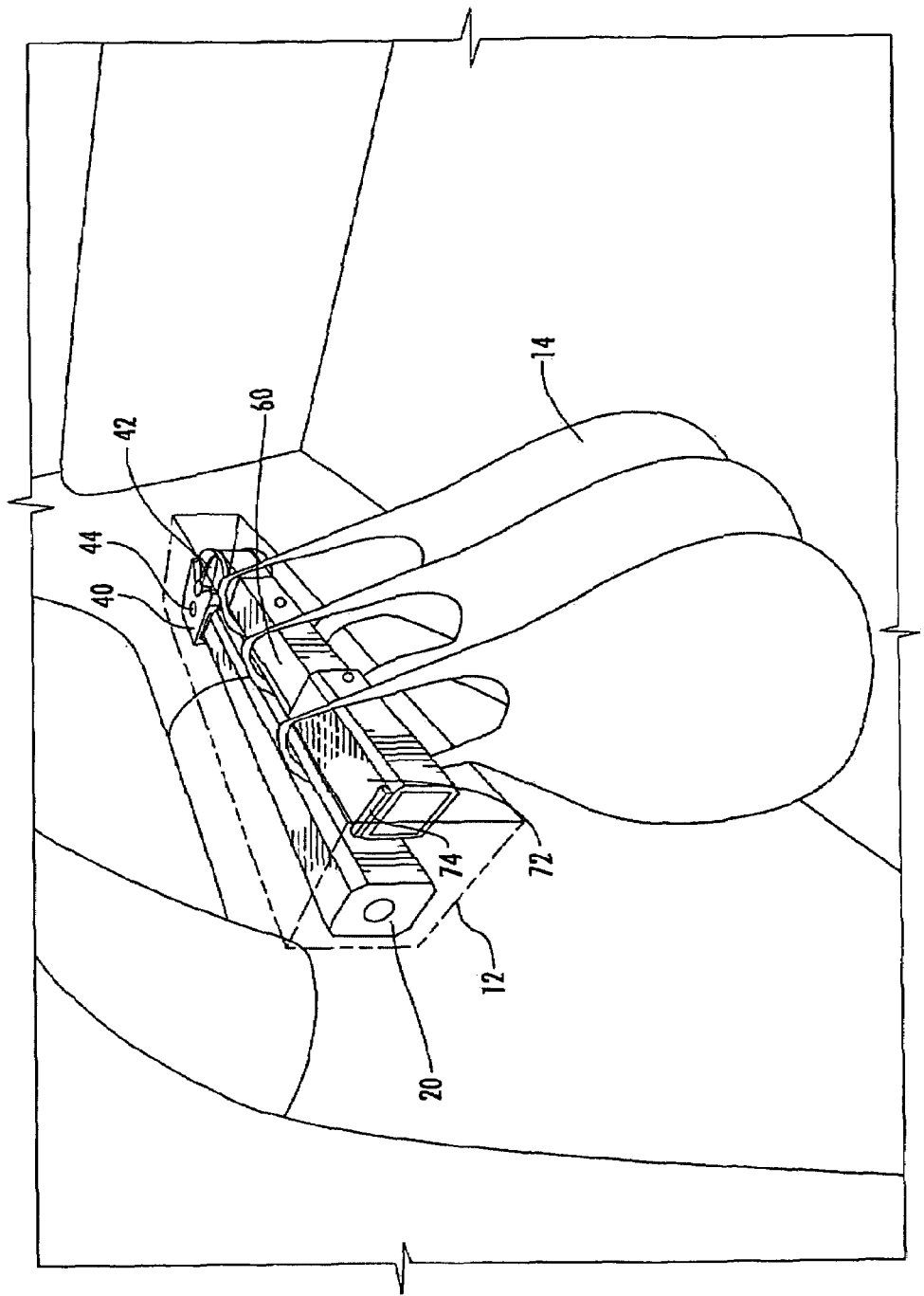
FIG. 28 is a front perspective view of a single grocery bag holder system returned to its stowing position in the system casing once three grocery bags were placed upon the grocery bar, and further illustrating the suspension of the grocery bags above the floor in the rear cargo compartment.

Referring now to FIG. 28, a single grocery bag holder system 10 returned to its stowing position in the system casing 12 once three grocery bags 14 were placed upon the grocery bar 60 is shown. The grocery bags 14 are shown suspended above the floor in the rear cargo compartment.

Figure 29:
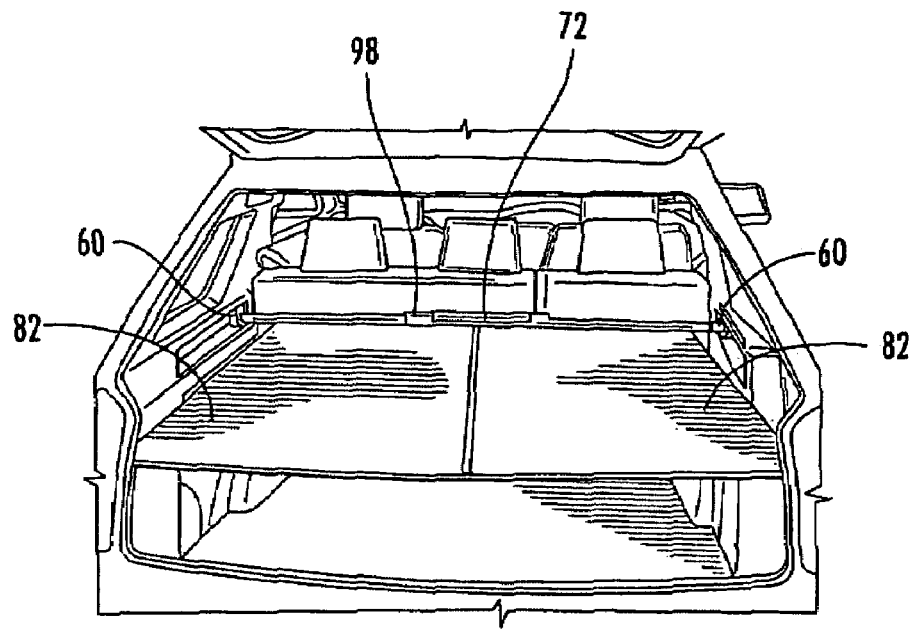
FIG. 29 is a front perspective view of a pair of grocery bag holder systems with integrated Tonneau covers secured at the front-most position in the linear track and illustrating the Tonneau covers extended rearward to cover and shield from view the entire area of the rear compartment in an automobile.

Referring now to FIG. 29, a pair of Tonneau cover bars 60 are shown in opposite relation to one another installed on opposing sides of an automobile. The opposing Tonneau cover bars 60 are rotated 90 degrees from the linear track 20 such that they face toward each other. The Tonneau cover bars 60 are placed in the front-most position in the linear track 20 so as to be closer to the front end of the automobile. A Tonneau cover bar handle 98 is partially on one Tonneau cover bar 60 and partially on the opposing Tonneau cover bar 60 thus securing the Tonneau cover bars together and providing a secure bar. The cover 82 is extended from each of the Tonneau cover bars 60 toward the rear of the automobile and secured so that the cover 82 obstructs the view of the contents of the rear of the automobile.

Figure 30:
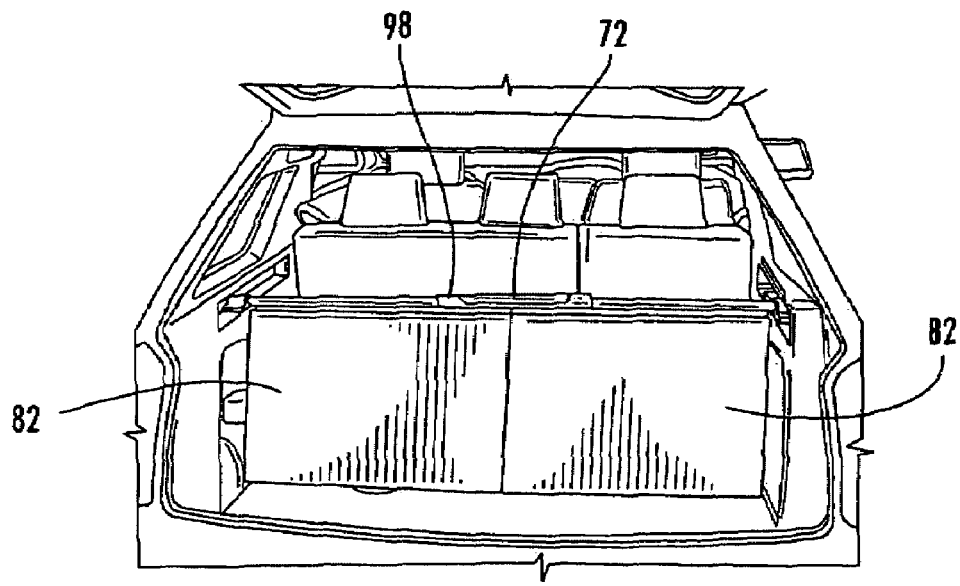
FIG. 30 is a front perspective view of a pair of grocery bag holder systems with integrated Tonneau covers secured partway down the linear track and illustrating the Tonneau covers extended from the grocery bag holder and secured to the floor of the automobile thus dividing the rear compartment into two distinct sections.

Referring now to FIG. 30, a pair of Tonneau cover bars 60 are shown in opposite relation to one another installed on opposing sides of an automobile. The opposing Tonneau cover bars 60 are rotated 90 degrees from the linear track 20 such that they face toward each other. The Tonneau cover bars 60 are placed in the rear-most position in the linear track 20 so as to be closer to the back end of the automobile. The Tonneau cover bar handle 98 is partially on one Tonneau cover bar 60 and partially on the opposing Tonneau cover bar 60 thus securing the Tonneau cover bars together and providing a secure bar. The cover 82 is extended from each of the Tonneau cover bars 60 downward toward the floor of the automobile and secured so that the cover 82 separates the rear compartment into two, distinct sections separated by the cover 82.

Figure 31:
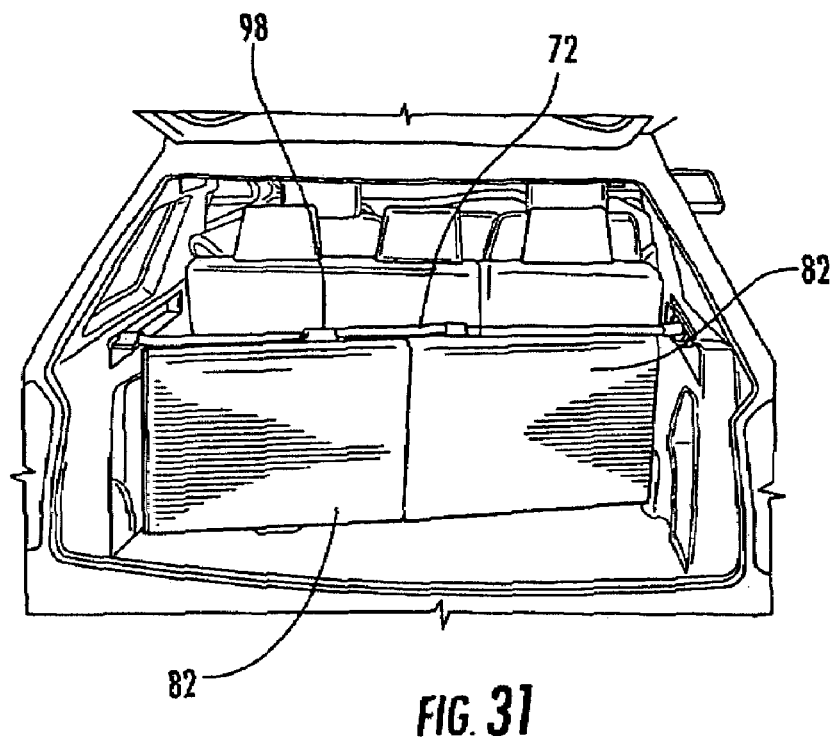
FIG. 31 is a front perspective view of a pair of grocery bag holder systems with integrated Tonneau covers where the driver side grocery bag holder system is secured in the rear position on the linear track and the passenger side grocery bag holder system is secured in the front position of the linear track where the Tonneau covers are extended and secured to the floor of the automobile thus dividing the rear compartment into two triangular sections.

Referring now to FIG. 31, a pair of Tonneau cover bars 60 are shown in opposite relation to one another installed on opposing sides of an automobile. The opposing Tonneau cover bars 60 are rotated from the linear track 20 such that they face toward each other. The Tonneau cover bar 60 on the driver side of the automobile is placed in the rear-most position in the linear track 20 so as to be closer to the back end of the automobile while the Tonneau cover bar 60 on the passenger side of the automobile is placed in the front-most position along the linear track 20. The Tonneau cover bar handle 98 is partially on one Tonneau cover bar 60 and partially on the opposing Tonneau cover bar 60 thus securing the Tonneau cover bars together and providing a secure bar. The cover 82 is extended from each of the Tonneau cover bars 60 downward toward the floor of the automobile and secured so that the cover 82 separates the rear compartment into two, distinct, triangular sections separated by the cover 82.

Figure 32:
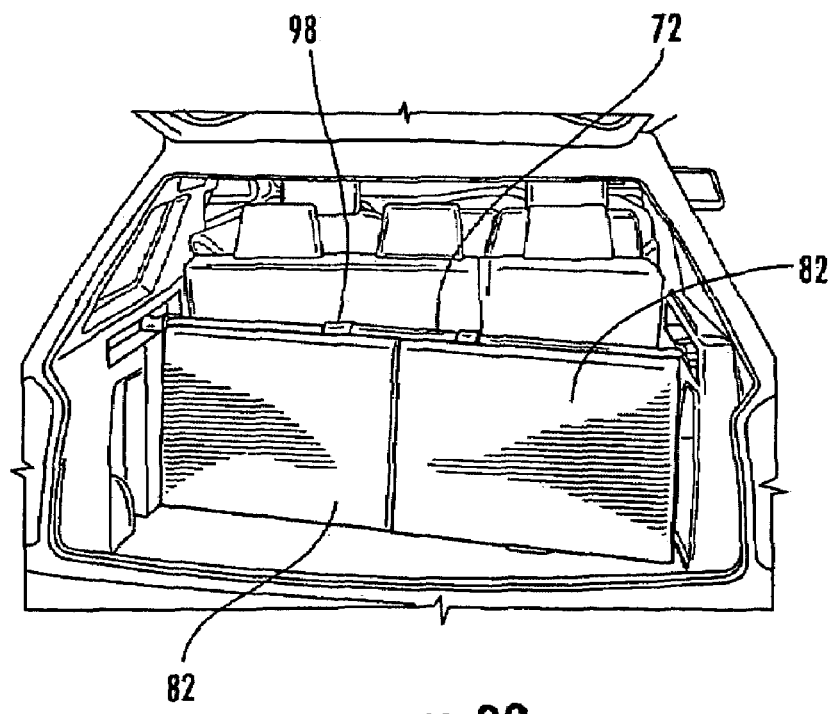
FIG. 32 is a front perspective view of a pair of grocery bag holder systems with integrated Tonneau covers where the driver side grocery bag holder system is secured in the front position on the linear track, and the passenger side grocery bag holder system is secured in the rear position of the linear track, and the Tonneau covers are extended and secured to the floor of the automobile thus dividing the rear compartment into two triangular sections.

Referring now to FIG. 32, the arrangement of the Tonneau cover bars 60 is substantially the mirror image of that shown in FIG. 31. More specifically, the Tonneau cover bar 60 on the driver side of the automobile is placed in the front-most position of the linear track 20 while the Tonneau cover bar 60 on the passenger side of the automobile is placed in the rear-most position on the linear track 20.

Figure 33:
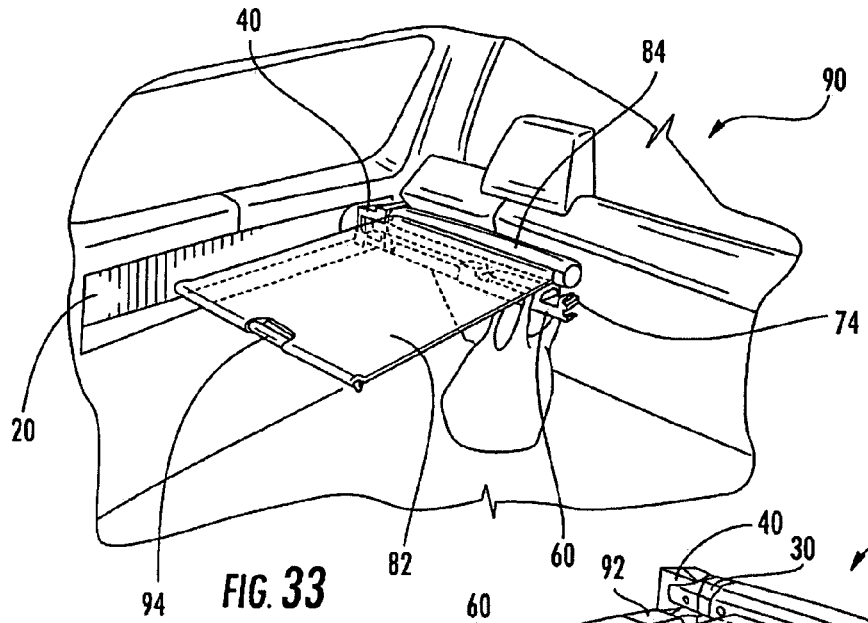
FIG. 33 is a front perspective view of the grocery bag holder system with a Tonneau cover bar above the grocery bag holder bar and further including a grocery bag secured to the grocery bar where the Tonneau cover is extended illustrating the relation of the Tonneau cover to the grocery bag when the Tonneau cover is extended.
Figure 34:
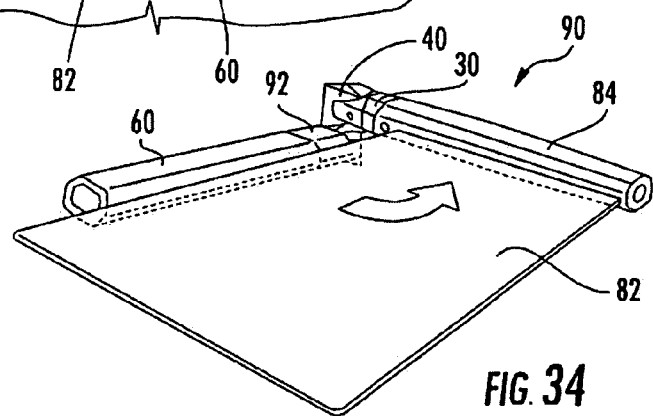
FIG. 34 is a front perspective view of the grocery bag holder system and including the Tonneau cover bar and in particular the relationship and independent rotational movement of the Tonneau cover bar from the grocery bag bar and the Tonneau cover extended.

Referring now to FIG. 33, a Tonneau cover system 90 is shown. Specifically, a Tonneau cover bar 84 is mounted to a pivot arm 30 which is attached to a linear slide 40 and able to slide on linear track 20 along the sides of the automobile. Further, a grocery bar 60 is also mounted on a second pivot arm 92, as seen in FIG. 34, which is attached to the linear slide 40 such that the second pivot arm 92 can pivot independently of pivot arm 30. Thus, the Tonneau cover bar 84 can pivot independently of the grocery bar 60. In FIG. 33, the grocery bar 60 is rotated with the Tonneau cover bar 84 such that the grocery bar 60 is directly underneath the Tonneau cover bar 84 and obstructed from view. The cover 82 is extended from the Tonneau cover bar 84 and thus obstructs the view of the grocery bag 14. A handle 94 in the cover 82 and a lip 74 on the grocery bar 60 are also illustrated.

Referring now to FIG. 34, a Tonneau cover system 90 is shown. Specifically, the Tonneau cover bar 84 is mounted on a first pivot arm 30 which is affixed to the linear slide 40. Extended from the Tonneau cover bar 84 is the cover 82 with the direction of retraction into the Tonneau cover bar 84 indicated by the arrow. Further, the grocery bar 60 is illustrated at a 90 degree angle from the Tonneau cover bar 84. The grocery bar 60 is mounted on a second pivot arm 92 which is attached below the first pivot arm 30 to the linear slide 40 such that the second pivot arm 92 can rotate independently of the first pivot arm 30. The grocery bar 60 is spaced from the Tonneau cover bar 84 such that a grocery bag 14 (not shown) can be placed onto the grocery bar 60 while still allowing the Tonneau cover bar 84 to rotate on the first pivot arm 30.

Figure 35:
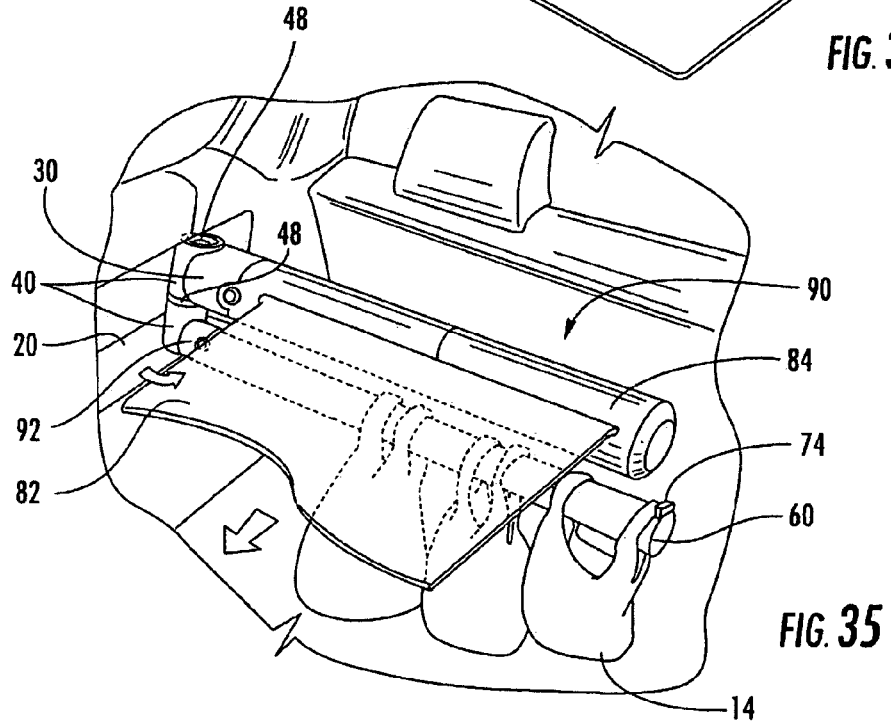
FIG. 35 is a front perspective view of the Tonneau cover bar mounted directly above the grocery bar and affixed to the pivot. The cover is extended from the Tonneau cover bar thus covering the grocery bar. Also illustrated are pivot arms for the Tonneau cover bar and the grocery bar. As seen, the two pivot arms are affixed in vertical relation to the pivot such that the pivot arms can rotate independently of each other.

Referring now to FIG. 35, a Tonneau cover system 90 is shown illustrating the Tonneau cover bar 84 mounted on the first pivot arm 30 with the cover 82 extended and the grocery bar 60 mounted on the second pivot arm 92 rotated: to be parallel to the Tonneau cover bar 84. Also shown are grocery bags 14 mounted on the grocery bar 60.

Figure 36:
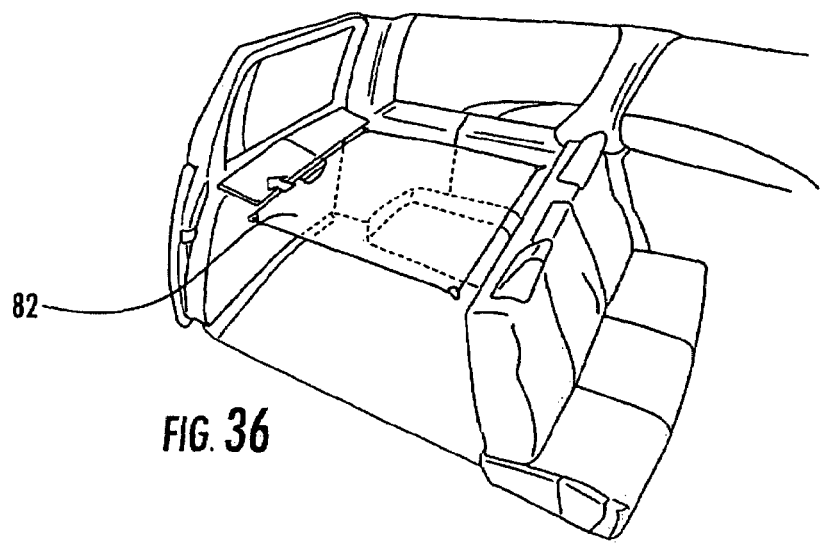
FIG. 36 is a side perspective view of the rear compartment of an automobile in particular showing the orientation of the Tonneau cover as it is extended from the Tonneau bar without first rotating the Tonneau bar 90 degrees from the linear track thus covering the rear compartment of the automobile in an alternate direction.

Referring now to FIG. 36, a cover 82 is shown in the rear of an automobile. Specifically, the cover 82 is extended from the Tonneau cover bar 84 while the Tonneau cover bar 84 is held within the linear track 20. Thus, the cover 82 extends from the front of the automobile toward the rear of the automobile.

Figure 37:
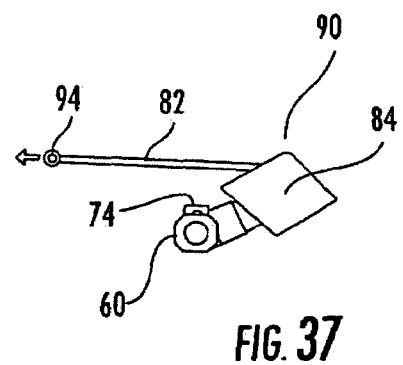
FIG. 37 is a front planar view of the grocery bag bar and the Tonneau cover bar with the Tonneau cover extended in particular showing the relation of the Tonneau cover bar to the grocery bar.

Referring now to FIG. 37, a Tonneau cover system 90 is shown illustrating the Tonneau cover bar 84 with the cover 82 extended outwardly from the Tonneau cover bar 84 and the cover handle 94 attached to the cover 82. Also illustrated is the grocery bar 60 with a raised lip 74 on the end mounted underneath the Tonneau cover bar 84 such that the cover 82 shields the grocery bags 14 from view when the cover 82 is extended from the Tonneau cover bar 84.

Figure 38:
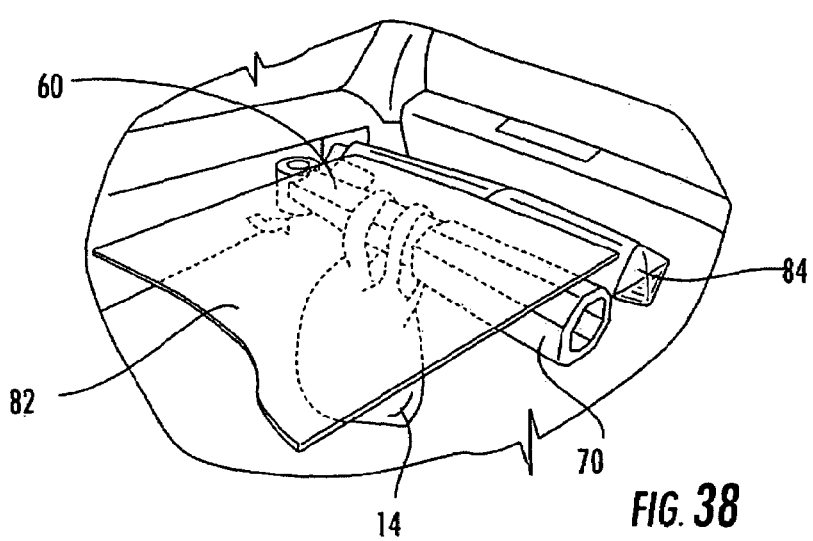
FIG. 38 is a front perspective view of the grocery bar and the Tonneau cover bar rotated 90 degrees from the linear track with the Tonneau cover extended, and further illustrating a grocery bag secured to the grocery bar and covered by the Tonneau cover.

Referring now to FIG. 38, a Tonneau cover system 90 is shown illustrating a Tonneau cover bar 84 wherein the cover 82 is extended outward from the Tonneau cover bar 84. Mounted underneath the Tonneau cover bar 84 is a grocery bar 60 showing the handle 70 and a grocery bag 14 secured to the grocery bar 60.

Figure 39:
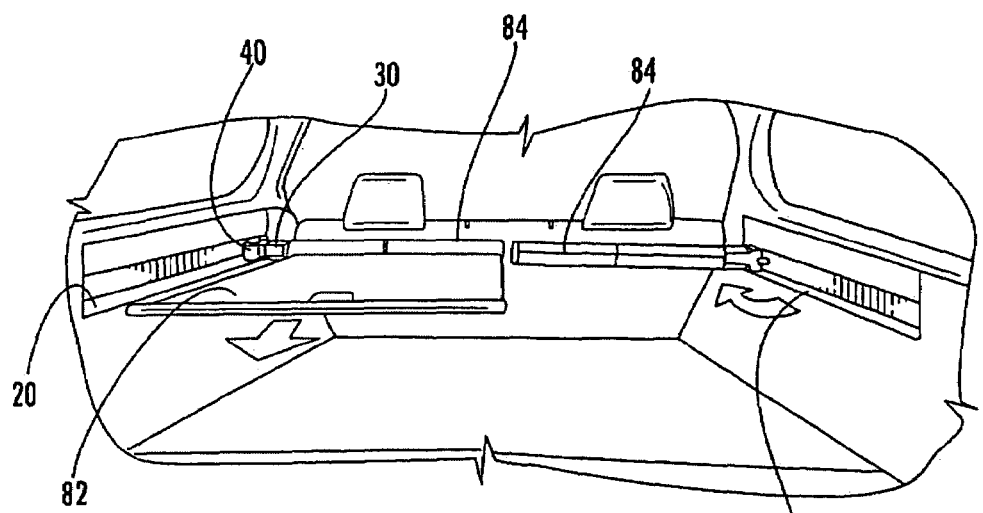
FIG. 39 is a front perspective view of a pair of Tonneau cover bars rotated 90 degrees away from the linear track illustrating rotational movement of the Tonneau cover bars, and further illustrating the extension movement of the Tonneau cover on the driver side illustrating the Tonneau cover being extended outward from the Tonneau cover bar toward the rear of the automobile.

Referring now to FIG. 39, a pair of Tonneau cover systems 90 is shown mounted on opposing sides of an automobile illustrating the operation of the cover 82 extended from the Tonneau cover bar 84 on the driver side of the automobile. The Tonneau cover bar 84 is rotated ninety degrees from the linear track 20 and faces the opposing Tonneau cover bar 84. The Tonneau cover bar 84 is mounted on the pivot arm 30. Further, the cover 82 is illustrated as retracted within the Tonneau cover bar 84 on the passenger side of the automobile.

Figure 40:
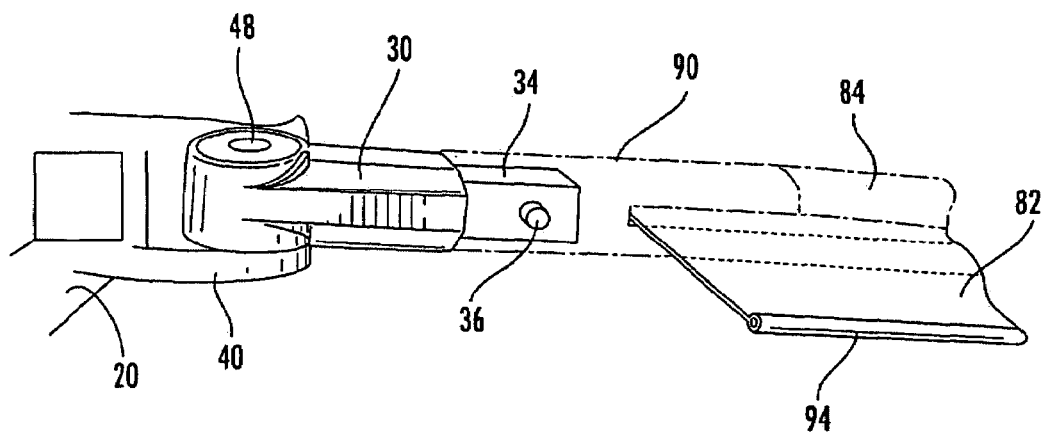
FIG. 40 is a front perspective view of the Tonneau cover bar illustrating the attaching mechanism to secure the Tonneau cover bar to the linear track and the pivot allowing the Tonneau cover bar to be rotated outward from the linear track 90 degrees.

Referring now to FIG. 40, a Tonneau cover system 90 is shown illustrating a cover 82 with a cover handle 94 extended from a Tonneau cover bar 84. The Tonneau cover bar 84 is secured to the pivot arm 30 by the pivot arm bar 34 and the quick release button 36. The pivot arm bar 34 is attached to the pivot arm 30 which rotates around the main pivot 48 secured to the linear slide 40. The linear slide 40 slides down the linear track 20 to allow the Tonneau cover system 90 to be secured near the front of the linear track 20 or at the rear of the linear track 20.

Figure 41:
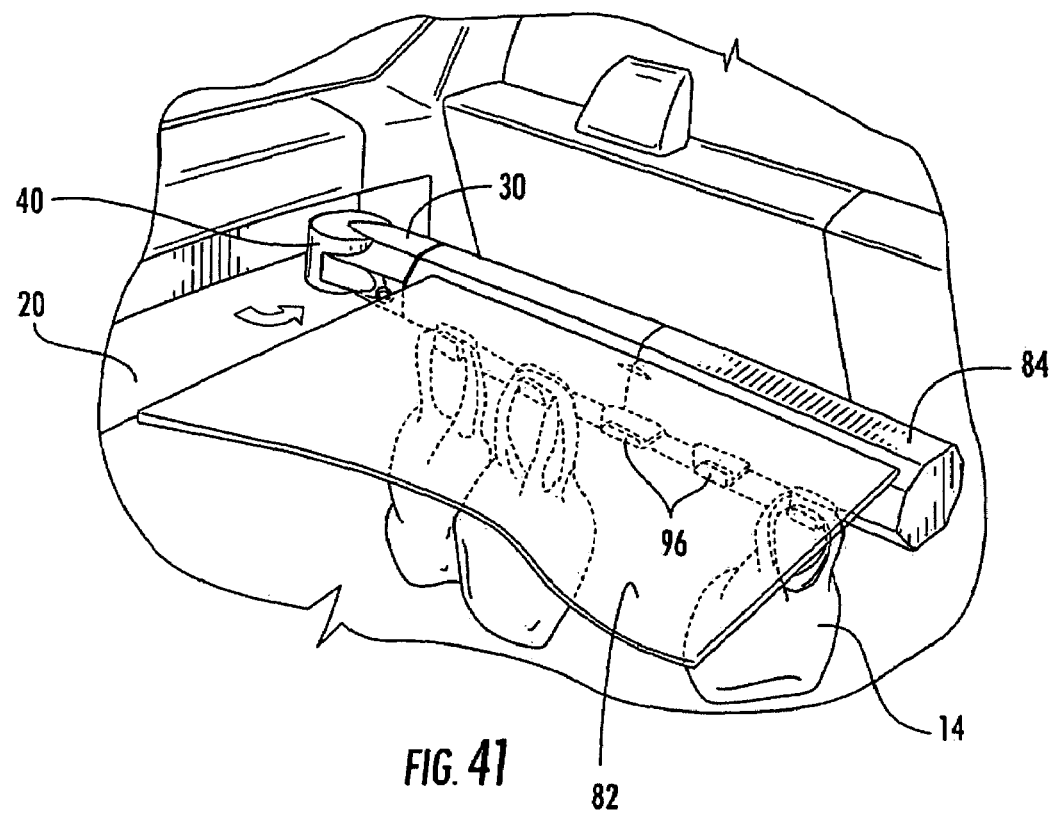
FIG. 41 is a front perspective view of the Tonneau cover bar with hooks attached to the base of the Tonneau cover bar and three grocery bags secured to the hooks illustrating the relationship of the Tonneau cover to the grocery bags when the Tonneau cover is extended from the Tonneau cover bar thus covering the grocery bags.

Referring now to FIG. 41, a Tonneau cover system 90 is shown illustrating a Tonneau cover bar 84 with a cover 82 extended from the Tonneau cover bar 84. Further, the Tonneau cover bar 84 is secured to the pivot arm 30 which is held on the linear track 20 by the linear slide 40. The Tonneau cover bar 84 is rotated ninety degrees on the pivot arm 30 such that the Tonneau cover bar 84 extends away from the driver side of the automobile toward the passenger side. Further illustrated are a plurality of hooks 96 attached to the base of the Tonneau cover bar 84 such that grocery bags 14 can be held to the Tonneau cover bar 84. Once the cover 82 is extended outward from the Tonneau cover bar 84, the grocery bags 14 secured by the hooks 96 are shielded from view.

Figure 42:
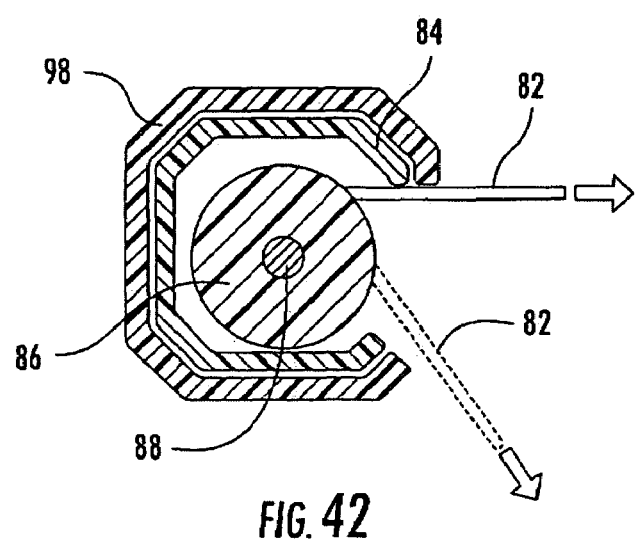
FIG. 42 is a side planar view of the Tonneau cover bar and the Tonneau cover, and further illustrating the spool around which the Tonneau cover is wound and the spool axle around which the spool rotates when the Tonneau cover is extended or reeled in, and further showing the handle covering the Tonneau cover bar.

Referring to FIG. 42, a Tonneau cover bar 84 is shown with a Tonneau cover bar handle 98 substantially surrounding the Tonneau cover bar 84. The Tonneau cover bar 84 encloses the cover 82 which is wrapped around a spool 86. The spool 86 is rotateably mounted on a spool axle 88 such that the spool 86 can rotate to extend or withdraw the cover 82 from the spool 86. The Tonneau cover bar 84 and the Tonneau cover bar handle 98 are manufactured to define a gap through which the cover 82 passes. The Tonneau cover bar 84 and the Tonneau cover bar handle 98 define a gap such that the cover 82 can extend outward at varying angles from the spool 86.

The grocery bag holder system 10 and the Tonneau cover system 90 are made from a variety of manufacturing materials well-known in the automotive industry. A key factor used in choosing manufacturing materials is the resultant strength of the grocery bar 60 and related components, such that the system 10 can maintain repeated use by a consumer, and support various weights. Manufacturing materials include, for example, steel, plastic, and nylon composite.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A Tonneau cover system for covering the contents in the rear of an automobile while alternatively providing a means for securely holding in place bags equipped with handles in an upright, suspended position while being transported in an automobile, the Tonneau cover system comprising:
   a system casing comprising a pivot arm;
   a horizontal bar member defining a gap connected to the pivot arm and selectively disposed within the system casing and selectively pivoting out of the system casing; and
   a cover wrapped around a spool assembly wherein the cover and the spool assembly are contained within the horizontal bar such that the cover is extendable through the gap in the horizontal bar, and the cover can be retracted into the horizontal bar such that once loaded with bags, the horizontal bar can be rotated back on the pivot arm and returned to the system casing, thus securely holding the bags in a suspended manner.

2. The Tonneau cover system of claim 1, wherein the spool assembly can rotate and the cover can extend outward from the horizontal bar through the gap or the spool can rotate in the opposite direction and the cover can be retracted into the horizontal bar through the gap.

3. The Tonneau cover system of claim 2, wherein the horizontal bar is sized to define a gap of such size to allow the cover to extend outward from the bar at varying angles.

4. The Tonneau cover system of claim 1, further comprising a raised lip, located on the top outer end of the horizontal bar, which prevents bag handles from sliding off of the horizontal bar.

5. The Tonneau cover system of claim 1, further comprising a handle on the cover.

6. The Tonneau cover system of claim 1, further comprising a handle on the horizontal bar, the handle defining a second gap in complimentary arrangement with the gap defined by the horizontal bar wherein the cover can extend through the second gap and the gap.

7. The Tonneau cover system of claim 1, further comprising a second horizontal bar member affixed to the pivot arm and extending downward before bending and extending substantially parallel to the horizontal bar such that once loaded with bags, the second horizontal bar will securely hold the bags in a suspended manner.

8. The Tonneau cover system of claim 1, further comprising a spring mechanism such that the spring mechanism exerts a force against the horizontal bar as it is rotated away from the system casing, such force tending to return the horizontal bar to the system casing.

9. The Tonneau cover system of claim 7, further comprising a spring mechanism such that the spring mechanism exerts a force against the second horizontal bar as it is rotated away from the system casing, such force tending to return the second horizontal bar to the system casing.

10. A Tonneau cover system for covering the contents in the rear of an automobile while providing a means for securely holding in place grocery bags equipped with handles in an upright, suspended position while being transported in an automobile, the Tonneau cover system comprising:
   a system casing comprising;
   a pivot arm;
   a horizontal bar member defining a gap connected to the pivot arm and selectively disposed within the system casing and selectively pivoting out of the system casing;
   a cover wrapped around a spool assembly wherein the cover and the spool assembly are contained within the horizontal bar such that the cover is extendable through the gap in the horizontal bar, and the cover can be retracted into the horizontal bar; and
   a fastener secured to the bottom of the horizontal bar for securing bags.

11. The Tonneau cover system of claim 10, further comprising a plurality of fasteners secured to the bottom of the horizontal bar for securing multiple bags.

12. The Tonneau cover system of claim 10, wherein the fastener is a hook.

13. The Tonneau cover system of claim 10, wherein the fastener is a clip.

14. The Tonneau cover system of claim 10, further comprising a spring mechanism such that the spring mechanism exerts a force against the horizontal bar as it is rotated away from the system casing, such force tending to return the horizontal bar to the system casing.

15. A Tonneau cover system for covering the contents in the rear of an automobile while providing a means for securely holding in place bags equipped with handles in an upright, suspended position while being transported in an automobile, the Tonneau cover system comprising:
   a system casing comprising;
   a first pivot arm;
   a first horizontal bar defining a gap connected to the first pivot arm and selectively disposed within the system casing and selectively pivoting out of the system casing;
   a cover wrapped around a spool assembly wherein the cover and the spool assembly are contained within the first horizontal bar such that the cover is extendable and retractable through the gap in the first horizontal bar;
   a second pivot arm;
   a second horizontal bar, the second horizontal bar being connected to the second pivot arm and selectively disposed within the system casing and selectively pivoting out of the system casing such that the second horizontal bar pivots independently of the first horizontal bar.

16. The Tonneau cover system of claim 15, further comprising a spring mechanism such that the spring mechanism exerts a force against the first horizontal bar as it is rotated away from the system casing, such force tending to return the first horizontal bar to the system casing.

17. The Tonneau cover system of claim 15, further comprising a spring mechanism such that the spring mechanism exerts a force against the second horizontal bar as it is rotated away from the system casing, such force tending to return the second horizontal bar to the system casing.

18. The Tonneau cover system of claim 15, further comprising a first spring mechanism such that the first spring mechanism exerts a force against the first horizontal bar as it is rotated away from the system casing, such force tending to return the first horizontal bar to the system casing; a second spring mechanism such that the second spring mechanism exerts a force against the second horizontal bar as it is rotated away from the system casing, such force tending to return the second horizontal bar to the system casing.

19. The Tonneau cover system of claim 15, further comprising a spring mechanism such that the spring mechanism exerts a force against the first horizontal bar and the second horizontal bar as the first horizontal bar and the second horizontal bar are rotated away from the system casing, such force tending to return the first horizontal bar and the second horizontal bar to the system casing.

* * * * *